(12) United States Patent
Kim et al.

(10) Patent No.: US 12,654,607 B2
(45) Date of Patent: Jun. 16, 2026

(54) LOCKING DEVICE AND KNOBLESS ARMREST ASSEMBLY INCLUDING THE SAME

(71) Applicant: SEOYON E-HWA CO., LTD., Anyang (KR)

(72) Inventors: Jae Min Kim, Ansan (KR); Bong Ju Choi, Anyang (KR)

(73) Assignee: SEOYON E-HWA CO., LTD., Anyang (KR)

( * ) Notice: Subject to any disclaimer, the term of this patent is extended or adjusted under 35 U.S.C. 154(b) by 107 days.

(21) Appl. No.: 18/823,802

(22) Filed: Sep. 4, 2024

(65) Prior Publication Data

US 2025/0100433 A1 Mar. 27, 2025

(30) Foreign Application Priority Data

Sep. 22, 2023 (KR) ........................ 10-2023-0127115

(51) Int. Cl.
B60N 2/75 (2018.01)
B60N 2/90 (2018.01)

(52) U.S. Cl.
CPC ............. B60N 2/767 (2018.02); B60N 2/753 (2018.02); B60N 2/933 (2018.02)

(58) Field of Classification Search
CPC ........ B60N 2/767; B60N 2/753; B60N 2/933; E05D 11/087; E05D 11/08
See application file for complete search history.

(56) References Cited

U.S. PATENT DOCUMENTS

| | | | | |
|---|---|---|---|---|
| 4,307,913 A | * | 12/1981 | Spiegelhoff .............. | B60N 2/77 |
| | | | | 297/115 |
| 4,496,190 A | * | 1/1985 | Barley ................... | B60N 2/773 |
| | | | | 297/411.32 |
| 4,882,807 A | * | 11/1989 | Frye ........................ | E05D 11/06 |
| | | | | 16/361 |
| 4,953,259 A | * | 9/1990 | Frye ........................ | B60N 2/847 |
| | | | | 16/337 |

(Continued)

FOREIGN PATENT DOCUMENTS

| | | | | |
|---|---|---|---|---|
| DE | 102008030160 A1 | * | 9/2009 | ............. B60N 2/753 |
| EP | 3098110 A1 | * | 11/2016 | ............. B60N 2/943 |

(Continued)

OTHER PUBLICATIONS

Office Action From German Patent Office Dated Nov. 24, 2025 Issued for German Patent Application No. 102024127045.4.

*Primary Examiner* — William L Miller
(74) *Attorney, Agent, or Firm* — Harvest IP Law, LLP

(57) ABSTRACT

The locking device includes a cam member rotatable about a second axis parallel to a first axis and a rotator for transmitting rotational force of an armrest to the cam member in a contact manner to control rotation of the cam member. When the armrest is rotated, the rotator is rotated about the first axis, and a locking tooth of the rotator is moved so as to pass through a locking position. The cam member is rotated in accordance with control operation of rotation of the rotator, and a locking recess in the cam member is moved so as to pass through the locking position. When the armrest is rotated to assume a locking posture, the locking tooth and the locking recess are moved to the locking position, and the locking tooth is inserted into the locking recess.

16 Claims, 17 Drawing Sheets

(56)  References Cited

U.S. PATENT DOCUMENTS

| | | | | |
|---|---|---|---|---|
| 5,033,792 | A * | 7/1991 | Kanazawa | B60N 2/753 |
| | | | | 297/411.32 |
| 5,702,157 | A * | 12/1997 | Hurite | B60N 2/767 |
| | | | | 297/411.32 |
| 8,943,650 | B2 * | 2/2015 | Anderson | B60N 2/793 |
| | | | | 16/342 |
| 9,758,074 | B1 * | 9/2017 | Lin | B60N 2/933 |
| 9,821,691 | B2 * | 11/2017 | Brockman | B60N 2/943 |
| 9,937,827 | B1 | 4/2018 | Choi | |
| 10,814,762 | B2 * | 10/2020 | Faccin | B60N 2/753 |
| 11,319,074 | B2 * | 5/2022 | Wenger | B64D 11/0644 |
| 11,752,910 | B2 * | 9/2023 | Boddenberg | B60N 2/767 |
| | | | | 297/411.32 |
| 12,503,236 | B2 * | 12/2025 | Mansouri | B64D 11/0644 |
| 2004/0135419 | A1 * | 7/2004 | Kitamura | B60N 2/753 |
| | | | | 297/411.3 |
| 2007/0007811 | A1 * | 1/2007 | Chung | B60N 2/767 |
| | | | | 297/411.32 |
| 2009/0309407 | A1 * | 12/2009 | Saito | A47C 7/543 |
| | | | | 297/411.32 |
| 2020/0047651 | A1 | 2/2020 | Faccin | |
| 2022/0314855 | A1 * | 10/2022 | Li | B60R 7/04 |
| 2023/0158931 | A1 | 5/2023 | Li | |

FOREIGN PATENT DOCUMENTS

| | | | | | |
|---|---|---|---|---|---|
| JP | 2010110401 | A * | 5/2010 | | |
| KR | 10-2002-0043111 | A | 6/2002 | | |
| KR | 10-1836472 | B1 | 3/2018 | | |
| KR | 20180039411 | A * | 4/2018 | | B60N 2/767 |
| KR | 10-2340086 | B1 | 12/2021 | | |
| KR | 10-2022-0040852 | A | 3/2022 | | |
| KR | 10-2002-0055238 | A | 5/2022 | | |

* cited by examiner

LOCKING DEVICE AND KNOBLESS ARMREST ASSEMBLY INCLUDING THE SAME

CROSS-REFERENCE TO THE RELATED APPLICATION

The present application claims priority to and the benefit of Korean Patent Application No. 10-2023-0127115, filed on Sep. 22, 2023, in the Korean Intellectual Property Office, the entire disclosure of which is incorporated herein by reference.

BACKGROUND

1. Field

Embodiments of the present disclosure relate to an armrest assembly for vehicles.

2. Description of the Related Art

Vehicles include an armrest for convenience of an occupant such as a driver. An armrest is provided in various forms in the interior (cabin) of vehicles. For example, an armrest may be provided in a form of constituting a vehicle seat or a form of constituting a center console disposed between a driver seat and a front passenger seat in a vehicle.

In general, an armrest for vehicles includes an armrest main body configured to be rotatable about an axis, a knob provided at a distal end of the armrest main body so as to be operated by an occupant, and a locking device configured to restrict or allow rotation of the armrest main body in conjunction with operation of the knob.

Such an armrest for vehicles has a problem in that the locking device has a very complicated structure and/or a problem in that the locking device is operated incorrectly when used for a long period of time. For this reason, manufacture of the armrest and/or maintenance thereof is costly.

In addition, in order to rotate the armrest main body, it is necessary to operate the knob to release restraint of the armrest main body by the locking device. To this end, an occupant needs to move his/her hand to the knob, and thus there is inconvenience in use in that rotation of the armrest main body is possible only through consistent operation of the knob.

In addition, in a case in which the armrest is provided in a form of constituting a center console between a driver seat and a front passenger seat, the armrest main body may act as an element that restricts or interferes with action of an occupant sitting in the driver seat or the front passenger seat.

Meanwhile, one of the requirements for future vehicles is to achieve a wider variety of seat variations. In the art to which the disclosure pertains, research and development is being actively conducted to more efficiently implement forward/backward movement of a seat, leftward/rightward movement of a seat, and/or swiveling of a seat for seat variation. In this situation, however, a conventional armrest constituting a center console may greatly hinder seat variation.

SUMMARY

Embodiments of the present disclosure provide an armrest assembly for vehicles capable of accurately controlling rotation of an armrest with a more simplified structure.

Embodiments of the present disclosure provide an armrest assembly for vehicles capable of being used more conveniently.

Embodiments of the present disclosure provide an armrest assembly for vehicles allowing not only an occupant on a front seat (a driver seat or a front passenger seat) but also an occupant on a rear seat to use an armrest. In one example, an armrest is provided as a table for a rear seat.

Embodiments of the present disclosure provide an armrest assembly for vehicles that is advantageous in terms of seat variation.

The objects to be accomplished by the disclosure are not limited to the above-mentioned objects, and other objects not mentioned herein will be clearly understood by those skilled in the art from the following description.

According to an embodiment of the present disclosure, there may be provided an armrest assembly for vehicles, which includes an armrest mount, an armrest mounted on the armrest mount and configured to be rotatable about a first axis, the armrest being configured to be changed in posture in accordance with rotation thereof, a cam member configured to be rotatable about a second axis parallel to the first axis, and a rotator connected to the armrest so as to be rotated together with the armrest, the rotator being configured to transmit rotational force of the armrest to the cam member by contact to control rotation of the cam member, wherein the rotator includes a first tooth (locking tooth) configured to be moved so as to pass through a locking position between the first axis and the second axis during rotation of the rotator, the cam member includes a locking recess movable so as to pass through the locking position in accordance with rotation control of the rotator in a contact manner, and when the posture of the armrest is changed to a locking posture, the first tooth and the locking recess are moved by rotation to the locking position, and the first tooth is inserted into the locking recess.

The armrest mount may be provided between a driver seat and a front passenger seat, which are front seats mounted in the cabin of the vehicle. The armrest mount may include a fixed member disposed between the driver seat and the front passenger seat, a movable member provided on the fixed member so as to be movable in a horizontal direction, and a support provided at the movable member, the support being configured to support the armrest so that the armrest is rotatable about the first axis.

The first axis may be disposed in a leftward-rightward direction. The locking posture may be a posture at which the armrest is in a horizontal state.

When viewed from a left side of the armrest, a $1a^{th}$ rotational direction is a counterclockwise rotation direction and a $1b^{th}$ rotational direction is a clockwise rotation direction about the first axis, and the $1a^{th}$ rotational direction may correspond to a direction in which the armrest is rotated downwardly from the locking posture. A $2a^{th}$ rotational direction is a counterclockwise rotation direction and a $2b^{th}$ rotational direction is a clockwise rotation direction about the second axis.

The armrest may be changed in posture to a first posture with a distal end facing forward (refer to FIG. 2), a second posture with the distal end facing downward (refer to FIG. 3), and a third posture with the distal end facing backward (refer to FIG. 4) depending on the rotation of the armrest. The first posture may be the locking posture.

When the armrest is in the first posture, the armrest may be provided to an occupant on the front seat. When the armrest is in the second posture, the armrest may be folded with respect to the support. When the armrest is in the third posture, the armrest may be provided to an occupant on a rear seat.

When the armrest is in the second posture or the third posture, the armrest may be maintained in the second posture or the third posture by a stopper. The stopper may include a front stopper and a rear stopper.

The armrest mount may include the front stopper configured to restrict rotation of the armrest in the $1a^{th}$ rotational direction when the armrest is in the second posture, and may include the rear stopper configured to restrict rotation of the armrest in the $1b^{th}$ rotational direction when the armrest is in the third posture.

The first tooth may include a $1a^{th}$ contact side surface facing in the $1a^{th}$ rotational direction and a contact end surface defining a tooth end of the first tooth, and the locking recess may include a $1a^{th}$ inner surface facing in the $2a^{th}$ rotational direction and a $1b^{th}$ inner surface facing in the $2b^{th}$ rotational direction. When the first tooth is inserted into the locking recess, the $1a^{th}$ contact side surface may be brought into contact with the $1a^{th}$ inner surface, and the contact end surface may be brought into contact with the $1b^{th}$ inner surface, so that the first tooth may transmit rotational force of the armrest in the $1a^{th}$ rotational direction to the cam member in a manner of distributing the rotational force in two opposite rotational directions through the $1a^{th}$ inner surface and the $1b^{th}$ inner surface, thereby restricting rotation of the cam member in the $2b^{th}$ rotational direction (rotation of the armrest in the 1ath rotational direction).

The contact end surface may be formed in an arc shape corresponding to an imaginary inscribed circle centered on the first axis. When the first tooth is inserted into the locking recess, the $1b^{th}$ inner surface may be brought into point contact with the contact end surface outside the inscribed circle, so that, when the armrest is rotated in the $1b^{th}$ rotational direction from the first posture, the first tooth may be separated from the locking recess.

The cam member may include a first contact cam configured to be moved so as to pass through a first contact area having the locking position and a second contact cam configured to be moved by rotation so as to pass through a second contact area defined opposite the first contact area with respect to the second axis during rotation thereof.

In order to allow the locking recess to be located at the locking position in the first contact area or to be moved out of the locking position through control of rotation of the cam member in a contact manner, the rotator may include a first tooth configured to move the second contact cam into or out of the second contact area through contact with the first contact cam in the first contact area in accordance with rotation of the armrest, a second tooth configured to be moved so as to pass through the second contact area and to move the first contact cam into or out of the first contact area through contact with the second contact cam in the second contact area in accordance with rotation of the armrest, and a cam rail configured to approach and contact the first contact cam moved out of the first contact area so that the second contact cam is moved to the second contact area or to approach and contact the second contact cam moved out of the second contact area so that the first contact cam is moved to the first contact area in accordance with rotation of the armrest.

The first contact cam may include a $1a^{th}$ cam and a $1b^{th}$ cam adjacent to each other. The $1a^{th}$ inner surface may be formed at the $1a^{th}$ cam, the $1b^{th}$ inner surface may be formed at the $1b^{th}$ cam, and the locking recess may be formed between the $1a^{th}$ cam and the $1b^{th}$ cam. The $1a^{th}$ inner surface may be a $1a^{th}$ cam inner surface of the $1a^{th}$ cam, and the $1b^{th}$ inner surface may be a $1b^{th}$ cam inner surface of the $1b^{th}$ cam.

The $1a^{th}$ cam may include a $1a^{th}$ cam outer surface facing in the $2b^{th}$ rotational direction, and the $1b^{th}$ cam may include a $1b^{th}$ cam outer surface facing in the $2a^{th}$ rotational direction. The second contact cam may include a $2a^{th}$ cam and a $2b^{th}$ cam adjacent to each other. The $2a^{th}$ cam may include a $2a^{th}$ cam inner surface facing in the $2b^{th}$ rotational direction and a $2a^{th}$ cam outer surface facing in the $2a^{th}$ rotational direction, and the $2b^{th}$ cam may include a $2b^{th}$ cam inner surface facing in the $2a^{th}$ rotational direction and a $2b^{th}$ cam outer surface facing in the $2b^{th}$ rotational direction. The first tooth may include a $1b^{th}$ contact side surface facing in the $1b^{th}$ rotational direction, the second tooth may include a $2a^{th}$ contact side surface facing in the $1a^{th}$ rotational direction and a $2b^{th}$ contact side surface facing in the $1b^{th}$ rotational direction, and the cam rail may include a first contact rail disposed at a side facing in the $1a^{th}$ rotational direction and a second contact rail disposed at a side facing in the $1b^{th}$ rotational direction. The second tooth and the cam rail may be disposed opposite each other with respect to the first axis. When the armrest is in the first posture, the $2a^{th}$ cam may be located in the second contact area. When the first tooth is separated from the locking recess in the first posture, the second tooth may be moved to the second contact area. When the armrest is rotated in the $1a^{th}$ rotational direction, the first contact rail of the cam rail may approach the cam member, and when the armrest is rotated in the $1b^{th}$ rotational direction, the second contact rail of the cam rail may approach the cam member.

When the armrest is rotated by a set angle in the $1b^{th}$ rotational direction from the first posture and enters a ready posture in which the first tooth is separated from the locking recess, the $2b^{th}$ contact side surface of the second tooth may be brought into contact with the $2a^{th}$ cam outer surface, thereby rotating the cam member in the $2b^{th}$ rotational direction so that the $1a^{th}$ cam is located outside the first contact area and the $1b^{th}$ cam is located in the first contact area. When the armrest in the ready posture is rotated in the $1a^{th}$ rotational direction and the posture of the armrest is changed to the second posture, the first tooth may be moved to the first contact area in which the $1b^{th}$ cam is located, and the $1a^{th}$ contact side surface may be brought into contact with the $1b^{th}$ cam outer surface, thereby rotating the cam member in the $2b^{th}$ rotational direction so that the first contact cam is located outside the first contact area and the second contact cam is located outside the second contact area, and the first contact rail of the cam rail may approach the $2b^{th}$ cam outside the second contact area and may be brought into contact with the $2b^{th}$ cam outer surface, thereby rotating the cam member in the $2a^{th}$ rotational direction so that the $1a^{th}$ cam is located in the first contact area.

When the armrest is rotated in the $1b^{th}$ rotational direction from the second posture and enters the ready posture, the first tooth may be moved to the first contact area in which the $1a^{th}$ cam is located, and the $1b^{th}$ contact side surface may be brought into contact with the $1a^{th}$ cam outer surface, thereby rotating the cam member in the $2a^{th}$ rotational direction so that the $2a^{th}$ cam is located outside the second contact area and the $2b^{th}$ cam is located in the second contact area, and the second tooth may be moved to the second contact area in which the $2b^{th}$ cam is located, and the $2b^{th}$ contact side surface may be brought into contact with the $2b^{th}$ cam inner surface, thereby rotating the cam member in the $2b^{th}$ rotational direction so that the $1a^{th}$ cam is located in the first contact area and the $1b^{th}$ cam is located outside the first contact area. When the armrest in the ready posture is rotated in the $1a^{th}$ rotational direction and the posture of the armrest is changed to the first posture, the first tooth may be moved to the first contact area in which the $1a^{th}$ cam is located, and the $1a^{th}$ contact side surface may be brought into contact with the $1a^{th}$ cam inner surface, thereby rotating the cam member in the $2b^{th}$ rotational direction so that the locking recess is moved to the locking position and allowing the first tooth to be inserted into the locking recess at the locking position.

When the armrest is rotated in the $1b^{th}$ rotational direction from the first posture so that the first tooth is separated from the locking recess and the posture of the armrest is changed to the third posture, the $2b^{th}$ contact side surface of the second tooth may be brought into contact with the $2a^{th}$ cam outer surface, thereby rotating the cam member in the $2b^{th}$ rotational direction so that the first contact cam is located outside the first contact area and the second contact cam is located outside the second contact area, and the second contact rail of the cam rail may approach the $1a^{th}$ cam outside the first contact area and may be brought into contact with the $1a^{th}$ cam outer surface, thereby rotating the cam member in the $2a^{th}$ rotational direction so that the $2a^{th}$ cam is located in the second contact area and the $2b^{th}$ cam is located outside the second contact area.

When the armrest is rotated in the $1a^{th}$ rotational direction from the third posture and the posture of the armrest is changed to the first posture, the second tooth may be moved to the second contact area in which the $2a^{th}$ cam is located, and the $2a^{th}$ contact side surface may be brought into contact with the $2a^{th}$ cam inner surface, thereby rotating the cam member in the $2a^{th}$ rotational direction so that the $1a^{th}$ cam is located in the first contact area and the $1b^{th}$ cam is located outside the first contact area, and the first tooth may be moved to the first contact area in which the $1a^{th}$ cam is located, and the $1a^{th}$ contact side surface may be brought into contact with the $1a^{th}$ cam inner surface, thereby rotating the cam member in the $2b^{th}$ rotational direction so that the locking recess is moved to the locking position and allowing the first tooth to be inserted into the locking recess at the locking position.

The armrest assembly for vehicles according to the embodiment of the present disclosure may further include a hinge shaft providing the second axis. The cam member may be coupled to the hinge shaft, and the hinge shaft may be configured to have a free-stop function.

Solutions to solve the above problems may be concretely and clearly understood through embodiments to be described below and the accompanying drawings. In addition, various solutions other than the above solutions may be further provided.

BRIEF DESCRIPTION OF THE DRAWINGS

The accompanying drawings, which are incorporated in this specification, illustrate exemplary embodiments and serve to further illustrate the technical ideas of the disclosure in conjunction with the detailed description of exemplary embodiments that follows, and the disclosure is not to be construed as limited to what is shown in such drawings. In the drawings:

FIGS. 17A to 20E are views showing processes of changing the posture of the armrest in the armrest assembly for vehicles according to the embodiment of the present disclosure.

DETAILED DESCRIPTION OF EXEMPLARY EMBODIMENTS

Figure 1:
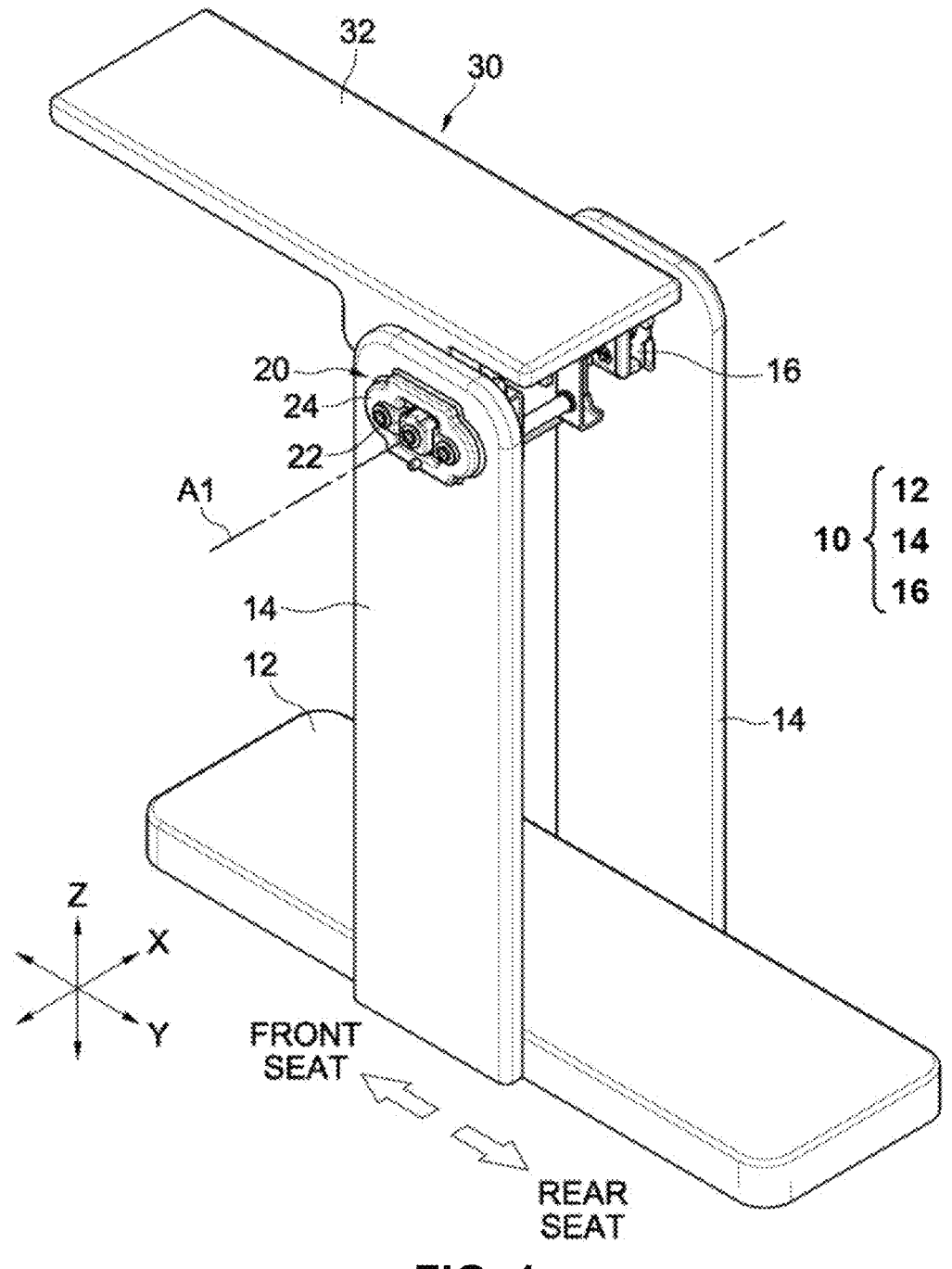
FIG. 1 is a perspective view showing an armrest assembly for vehicles according to an embodiment of the present disclosure.

Hereinafter, embodiments of the present disclosure will be described in detail with reference to the accompanying drawings so that those skilled in the art can easily carry out the embodiments. The present disclosure may, however, be embodied in many different forms, and should not be construed as being limited to the embodiments set forth herein.

In the following description of the embodiments of the present disclosure, a detailed description of known functions or configurations incorporated herein will be omitted when it may unnecessarily obscure the subject matter of the present disclosure. Throughout the drawings, parts performing similar functions and operations are denoted by the same reference numerals.

At least some of the terms used in this specification are terms defined taking into consideration the functions obtained in accordance with the present disclosure, and may be changed in accordance with the intention of users or operators or usual practice. Therefore, the definitions of these terms should be determined based on the total content of this specification. Further, throughout the specification, when a component is referred to as including another component, it is to be understood that it may further include other components, not excluding other components unless specifically indicated otherwise. Further, when a part is said to be connected (or coupled) to another part, the part and the other part may be directly connected (or coupled) to each other, or may be indirectly connected (or coupled) to each other with one or more intervening parts interposed therebetween.

In the drawings, the sizes or shapes of components and the thicknesses of lines may be exaggerated for convenience of explanation.

The present disclosure may provide a locking device, which is capable of performing rotation control of an armrest disposed in the cabin of a vehicle without a conventional operation knob in order to improve convenience of an occupant, and an armrest assembly including the same. In addition, the present disclosure may also provide a vehicle including such an armrest assembly. The armrest assembly according to the present disclosure is applicable to various objects constituting the cabin of the vehicle. However, the embodiments of the present disclosure will be described based on an example in which the armrest assembly is employed between a driver seat and a front passenger seat in the cabin of the vehicle.

The configuration and operation of the armrest assembly according to the embodiment of the present disclosure are shown in FIGS. 1 to 20.

Figure 7:
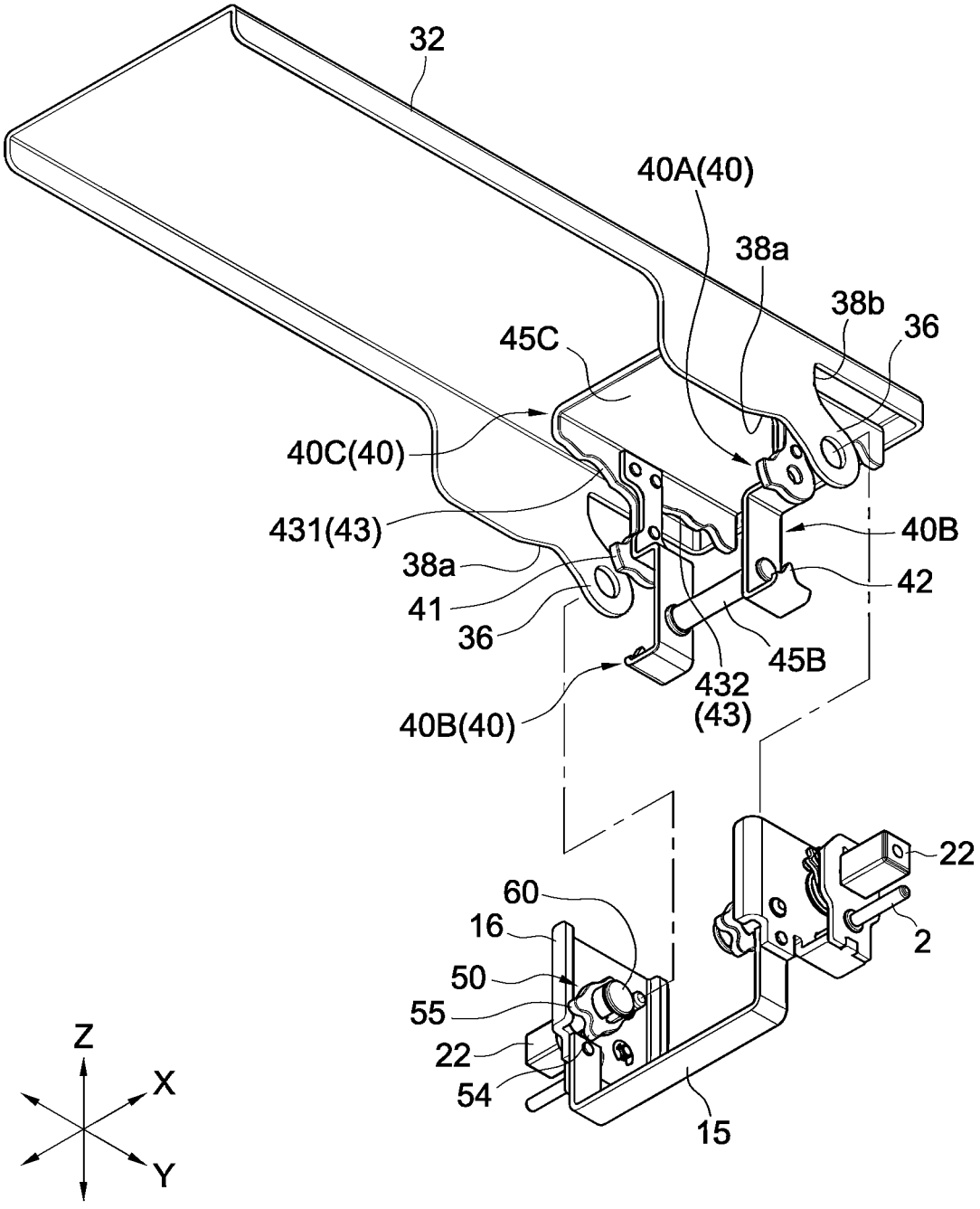
FIG. 7 is an exploded perspective view showing a portion of the armrest assembly for vehicles according to the embodiment of the present disclosure.

As shown in FIGS. 1 and 7, the armrest assembly according to the embodiment of the present disclosure may include an armrest mount 10, a shaft module 20, an armrest 30, and a locking unit (refer to 40, 50, and 60). The armrest assembly may be mounted by the armrest mount 10 in the cabin of the vehicle. Although not shown in the drawings, the vehicle may include a front seat and a rear seat provided with an interval therebetween in a forward-backward direction (Y-axis direction) in the cabin. The front seat may be composed of a driver seat and a front passenger seat arranged in a leftward-rightward direction (X-axis direction). For reference, the forward-backward direction may be a direction collectively referring to the forward direction of the vehicle and the backward direction of the vehicle. The leftward-rightward direction may be referred to as a width direction. The forward-backward direction may be referred to as a longitudinal direction.

The armrest mount 10 may be provided to be located between the driver seat and the front passenger seat in the cabin of the vehicle. As shown in FIG. 1, the armrest mount 10 may include a base 12 disposed in the space between the driver seat and the front passenger seat, a support 14 provided extending vertically from the base 12 in an upward-downward direction (Z-axis direction), and a fixed bracket 16 fixed attached to an upper end portion of the support 14. The upward-downward direction may be referred to as a height direction.

The base 12 may be mounted on a floor that defines the space between the driver seat and the front passenger seat. Although not shown in the drawings, the base 12 may include a fixed member and a movable member. The movable member is provided on the fixed member and is designed slide in a horizontal direction (a direction perpendicular to the upward-downward direction) and can be repositioned in accordance with the moving direction. The base 12 may further include a stop unit that restricts the movable member relative to the fixed member, thereby securing the position of the movable member.

In one example, the movable member may be capable of sliding horizontally in the forward-backward direction, while the stop unit may include a pressing body that penetrates the movable member and moves in the upward-downward direction. The pressing body may have a bolt structure that is screwed to the movable member, and thus may move upward or downward depending on the direction that the bolt structure rotates. The lower end of the pressing body may be brought into close contact with (pressed against) the upper surface of the fixed member to lock the movable member in place, or may be separated (or released) upward from the upper surface of the fixed member, to release the movable member, in accordance with upward/downward movement of the pressing body.

The support 14 may be coupled at its lower end portion to the base 12. Specifically, the lower end portion of the support 14 may be coupled to the movable member of the base 12. For example, the support 14 may be provided in a panel structure in which the width thereof is less than the length thereof.

Figure 5:
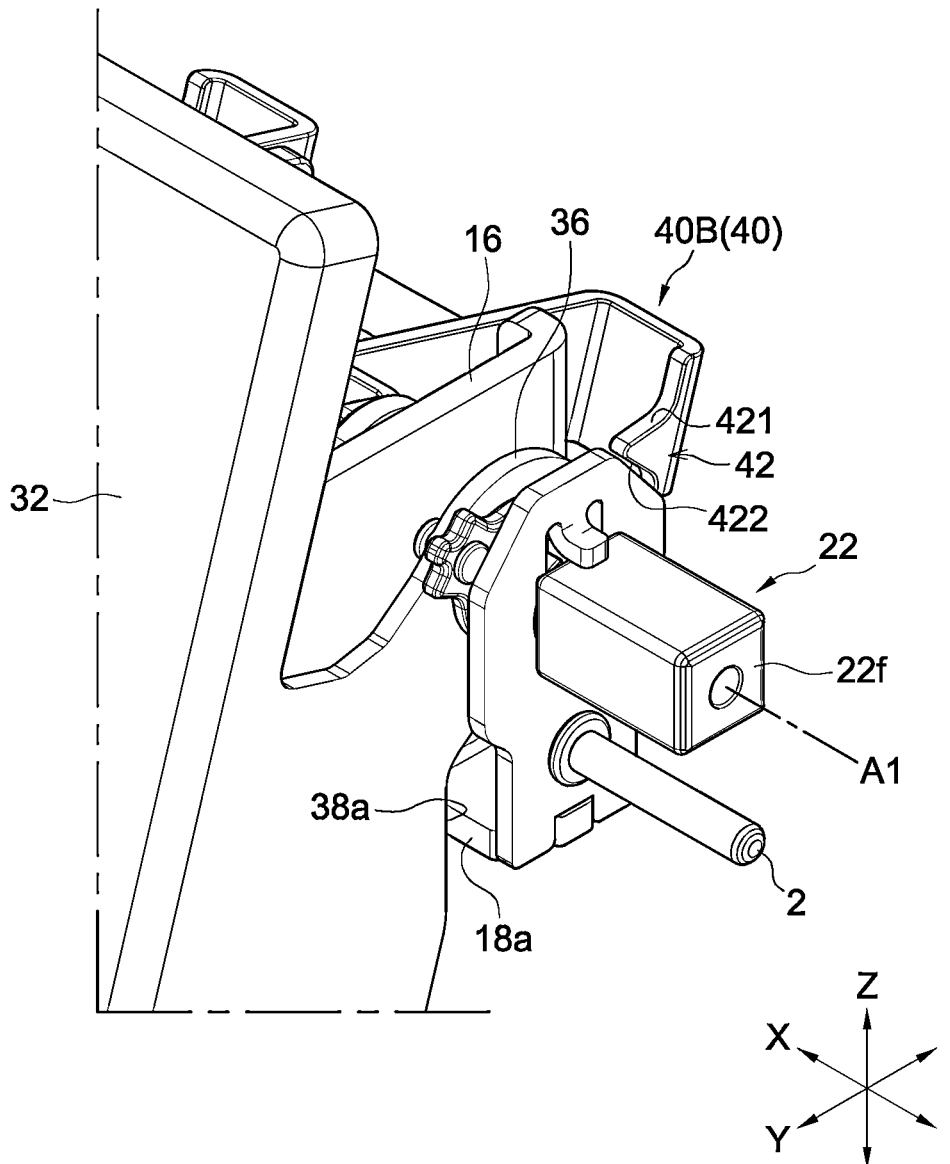
FIGS. 5 and 6 are perspective views showing a portion of the armrest in states in which the posture of the armrest is changed to the second posture and the third posture, respectively, in the armrest assembly for vehicles according to the embodiment of the present disclosure.
Figure 6:
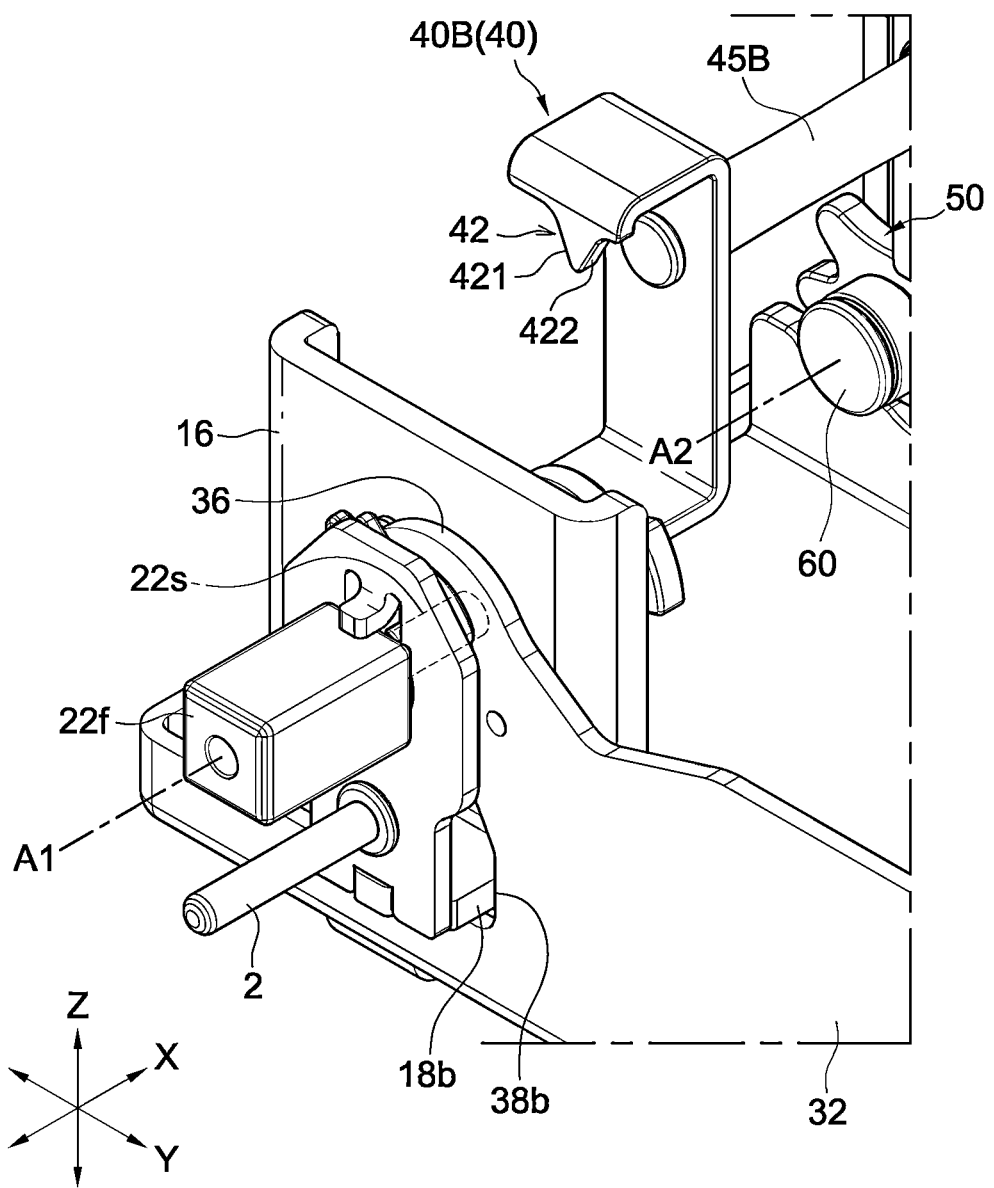

Referring to FIGS. 5 and 6, the armrest mount 10 may stably support the shaft module 20 using the fixed bracket 16. The fixed bracket 16 may be firmly mounted to the upper end portion of the support 14 by means of a mounting pin 2 or the like so as to be fixed in position.

As shown in FIGS. 1, 5, and 6, the shaft module 20 may include a shaft member 22 configured to provide a first axis A1 extending horizontally in the leftward-rightward direction (X-axis direction). The shaft member 22 may be supported by the fixed bracket 16. The shaft member 22 may be a fixed shaft that is maintained in a stationary state, and may include a fixed portion 22f and a support portion 22s disposed in the leftward-rightward direction. The shaft member 22 may function as a fixed shaft because the fixed portion 22f is firmly mounted to the support 14 by means of a fixed panel 24 in a state in which the support portion 22s is supported and fixed in position by the fixed bracket 16.

Figure 2:
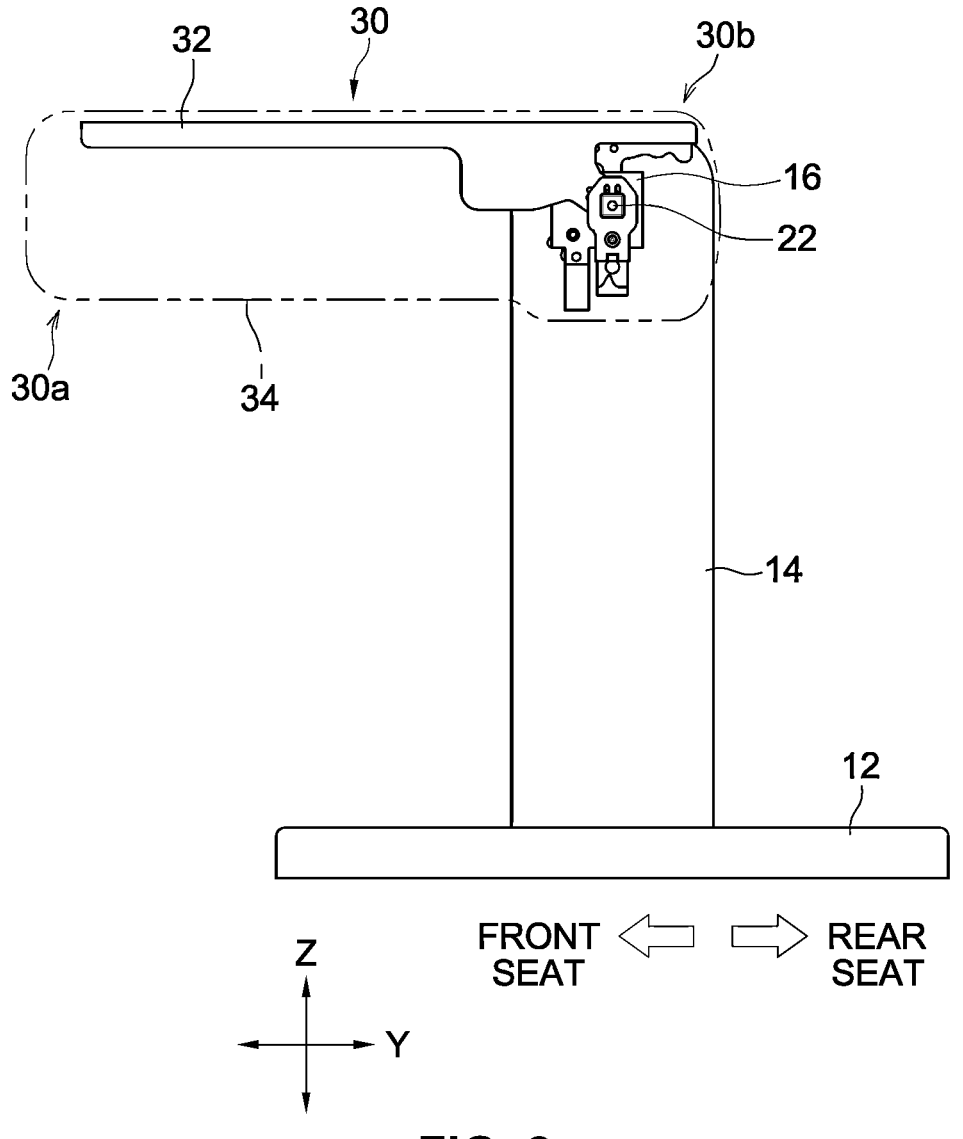
FIGS. 2 to 4 are schematic views showing states in which the posture of an armrest is changed to a first posture, a second posture, and a third posture, respectively, in the armrest assembly for vehicles according to the embodiment of the present disclosure when viewed from the left.

Referring to FIGS. 1, 2, and 5, the armrest 30 may be formed to have a predetermined length, and may include a distal end portion 30a and a proximal end portion 30b formed on both ends thereof in an extension direction of the armrest 30. The proximal end portion 30b may be configured to be rotatable about the first axis A1. Such an armrest 30 may include an armrest frame 32 including a distal end portion and a proximal end portion, which correspond to the distal end portion 30a and the proximal end portion 30b of the armrest 30, respectively. The armrest 30 may also include a hinge bracket 36 provided at the armrest frame 32. In addition, as shown in FIG. 2, the armrest 30 may further include a housing 34 configured to accommodate the fixed bracket 16, the armrest frame 32, and the hinge bracket 36 to protect the same from the outside.

As shown in FIGS. 5 to 7, the hinge bracket 36 may be rotatably coupled to the support portion 22s of the shaft member 22. The armrest 30 may rotate about the first axis A1 because the hinge bracket 36 is connected to the proximal end portion of the armrest frame 32. In one example, the hinge bracket 36 may be disposed between the support 14 and the fixed bracket 16, and may be integrated with the armrest frame 32. A rotational element configured to suppress increase in rotational speed of the armrest 30 using frictional force may be interposed between the support portion 22s of the shaft member 22 and the hinge bracket 36 of the armrest 30. The rotational element may induce the armrest 30 to rotate at a constant speed.

Such an armrest 30 may be changed in posture in accordance with rotation thereof about the first axis A1. In detail, the posture of the armrest 30 may be changed to a first posture in which the distal end portion 30a of the armrest 30 faces forward (refer to FIGS. 1 and 2), a second posture in which the distal end portion 30a of the armrest 30 faces downward (refer to FIG. 3), or a third posture in which the distal end portion 30a of the armrest 30 faces backward (refer to FIG. 4). The armrest 30 may be unfolded with respect to the armrest mount 10 in the first and third postures, and may be folded with respect to the armrest mount 10 in the second posture. The armrest 30 may be maintained in a horizontal state in the first and third postures, and may be maintained in a downwardly inclined state (or almost vertical state) in the second posture. For reference, in order to accommodate the armrest 30 in a folded state with respect to the armrest mount 10 when the posture of the armrest 30 is the second posture, the support 14 may be formed to extend vertically in the upward-downward direction (Z-axis direction). The height of the upper end portion of the support 14 is configured to ensure a predetermined distance between the upper end portion and the base 12.

Figure 3:
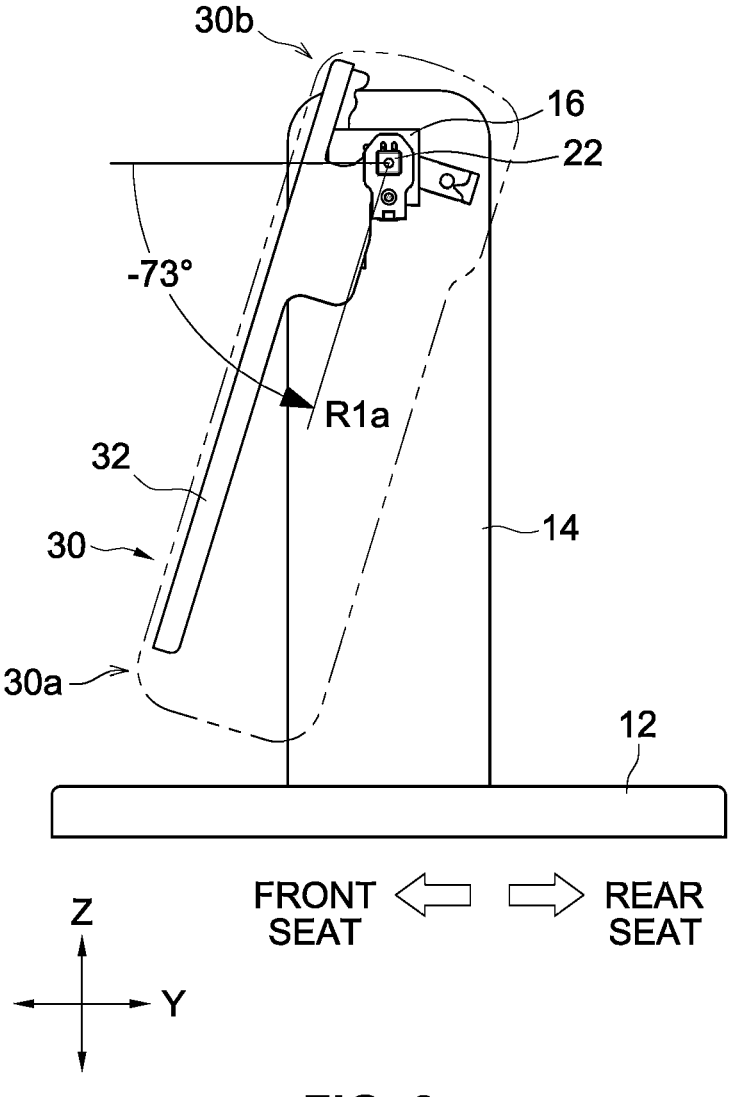
Figure 4:
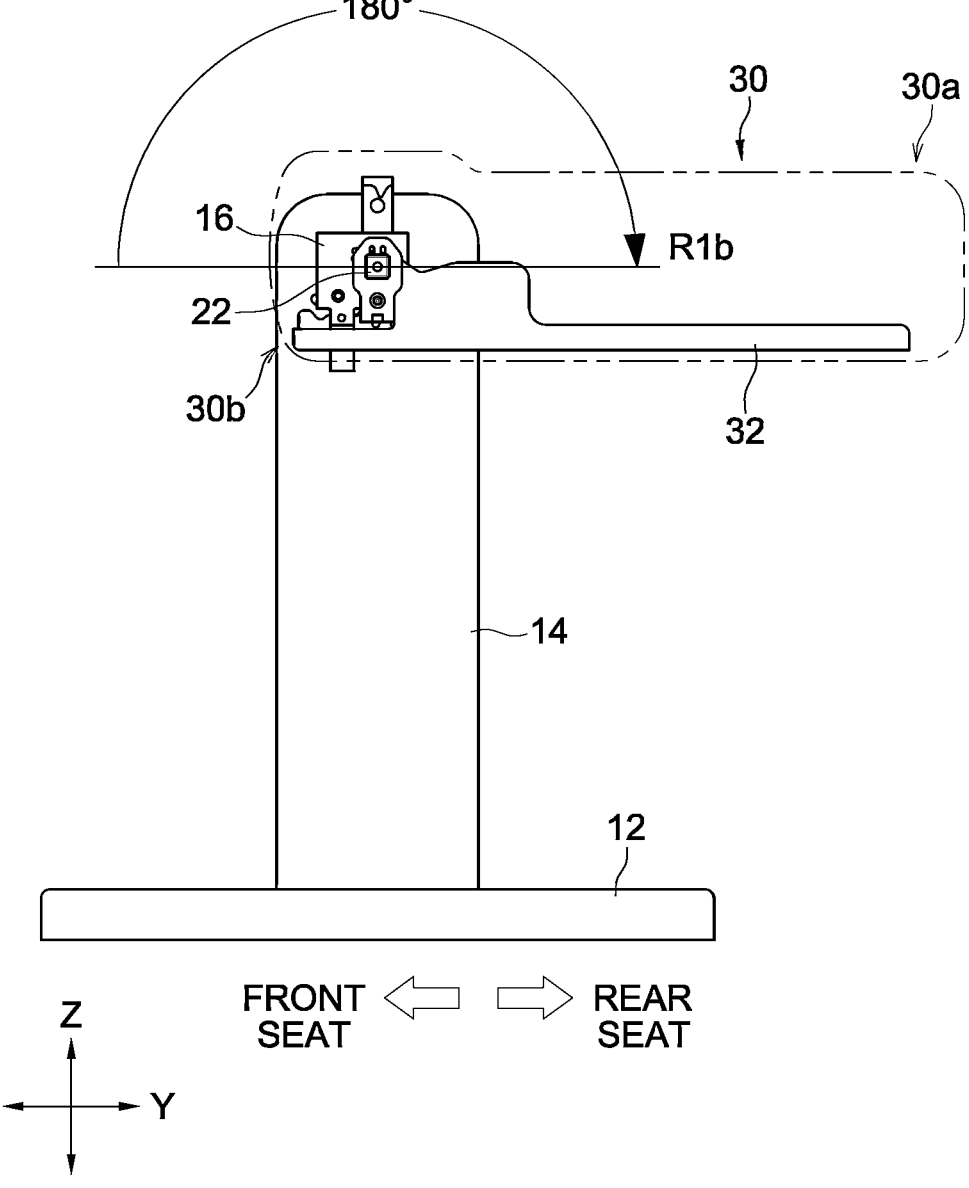

Referring to FIGS. 2 to 4, two opposite rotational directions about the first axis A1 are respectively referred to as a 1a$^{th}$ rotational direction R1a and a 1b$^{th}$ rotational direction R1b. While a rotational degree in the 1b$^{th}$ rotational direction R1b is denoted as a positive number, a rotational degree in the 1a$^{th}$ rotational direction R1a may be denoted as a negative number based on the first posture (0 degree).

When the armrest 30 is in the first posture, it is positioned at 0 degree. The second posture occurs when the armrest 30 is rotated downwardly, for example, 73 degrees in the 1a$^{th}$ rotational direction R1a (i.e., counterclockwise when viewed from the left) from the first posture (0 degree). The third posture may be a posture at which the armrest 30 is rotated 180 degrees in the 1b$^{th}$ rotational direction R1b, opposite to the 1a$^{th}$ rotational direction R1a, from the first posture.

As shown in FIG. 2, the armrest 30 may be provided such that the upper surface thereof faces upward between the driver seat and the front passenger seat, which are the front seats, when the posture thereof is the first posture (0°). Accordingly, an occupant sitting in the front seat may freely use the armrest 30 in a manner of, for example, comfortably leaning on the armrest 30 or placing his/her arm thereon.

As shown in FIG. 3, when the posture of the armrest 30 is changed from the first posture (0°) to the second posture (for example, −73°), the armrest 30 may be folded with respect to the armrest mount 10 and move out of the space between an occupant on the driver seat and an occupant on the front passenger seat. This movement creates an additional space between the occupant on the driver seat and the occupant on the front passenger seat. The occupants on the front seats may act more freely or may take a more comfortable posture thanks to the secured extra space.

As shown in FIG. 4, when the posture of the armrest 30 is changed from the first posture (0°) to the third posture (180°), the armrest 30 may be flipped 180 degrees. In this posture, the lower surface thereof may face upward, and the distal end portion 30a thereof may protrude from the space between the driver seat and the front passenger seat toward the rear seat and become available to an occupant on the rear seat. Accordingly, the occupant on the rear seat may utilize the armrest 30 as a table or the like in a manner of, for example, placing an item such as a mobile phone on the lower surface of the armrest facing upward.

Meanwhile, at least one of the seats (the front seat, the rear seat, etc.) in the vehicle may implement forward/backward movement, leftward/rightward movement, and/or swiveling for seat variation, and the posture of the armrest 30 may be selectively changed to a suitable posture among the first posture (0°), the second posture (−73°), and the third posture (180°) in accordance with seat variation.

The first posture (0°) of the armrest 30 may be maintained by a locking unit (refer to 40, 50, and 60), the second posture (−73°) thereof may be maintained by a front stopper 18a (refer to FIG. 5), and the third posture (180°) thereof may be maintained by a rear stopper 18b (refer to FIG. 6). The front stopper 18a may restrict the armrest 30 from further rotating in the 1a$^{th}$ rotational direction R1a beyond the angle of the second posture, and the rear stopper 18b may restrict the armrest 30 from further rotating in the 1b$^{th}$ rotational direction R1b beyond the angle of the third posture. The armrest mount 10 may be provided with the front stopper 18a and the rear stopper 18b described above. In one example, the front stopper 18a and the rear stopper 18b may be provided at the fixed bracket 16.

The front stopper 18a may be provided to restrict rotation of the armrest 30 by contact with the armrest frame 32 when the posture of the armrest 30 is changed to the second posture (−73°), and the rear stopper 18b may be provided to restrict rotation of the armrest 30 by contact with the armrest frame 32 when the posture of the armrest 30 is changed to the third posture (180°). The armrest frame 32 may be formed to have a contact portion 38a (refer to FIG. 5) formed to be in contact with the front stopper 18a when the posture of the armrest 30 is the second posture and a contact portion 38b (refer to FIG. 6) formed to be in contact with the rear stopper 18b when the posture of the armrest 30 is the third posture.

The locking unit (refer to 40, 50, and 60) may be configured to perform locking operation or unlocking operation in accordance with rotation of the armrest 30. The locking unit (referring to 40, 50, and 60) may also maintain the armrest 30 in the first posture through the locking operation thereof when the posture of the armrest 30 is changed to the first posture (0°).

Referring to FIGS. 7 to 10, the locking unit may include a rotator 40, a cam member 50, and a hinge shaft 60. The hinge shaft 60 may provide a second axis A2 extending horizontally in the leftward-rightward direction (X-axis direction) at a position close to the first axis A1. The second axis A2 is parallel to the first axis A1. The cam member 50 is configured to be rotatable about the second axis A2 close to the first axis A1. The rotator 40 may be connected to the armrest 30 and may be rotated about the first axis A1 integrally together with the armrest 30. In addition, the rotator 40 may be configured to transmit rotational force applied to the armrest 30 by the occupant to the cam member 50 thorough contact, thereby controlling rotation of the cam member 50.

The cam member 50 may include first contact cams (refer to 52 and 53) and second contact cams (refer to 54 and 55) formed to contact the rotator 40 according to rotation. The second contact cams (54, 55) are positioned on the opposite side of the first contact cams (52, 53) relative to the second axis A2, such that the second axis A2 is positioned centrally between the first contact cams (52, 53) and the second contact cams (54, 55). The first contact cams (refer to 52 and 53) may be formed to form a locking recess 51. The rotator 40 may include a lock 40A having a first tooth 41 formed to contact the first contact cams (refer to 52 and 53), a contact element 40B having a second tooth 42 formed to contact the second contact cams (refer to 54 and 55), and an operation cam 40C having a cam rail 43 formed to contact one selected from among the first contact cams (refer to 52 and 53) and the second contact cams (refer to 54 and 55) depending on the rotation of the rotator 40.

Here, when the posture of the armrest 30 rotates to the first posture (0°), the rotator 40 may rotate the cam member 50 to move the locking recess 51 to a locking position, and the first tooth 41 may be moved to the locking position to be inserted into the locking recess 51 (locking: restriction of rotation of the armrest 30 through restriction of rotation of the cam member 50 (refer to FIGS. 8 to 10)). In addition, when the armrest 30 is rotated from the first posture (0°) for posture change thereof, the rotator 40 may rotate the cam member 50 so that the first tooth 41 escapes from the locking position to be separated from the locking recess 51 (unlocking (refer to FIGS. 11 and 12)) and insertion of the first tooth 41 into the locking recess 51 is prevented. Also, the rotator 40 may also move the locking recess 51 so that the locking recess 51 escapes from the locking position. Of course, when the posture of the armrest 30 is changed back to the first posture (0°) from the second posture (−73°) or the third posture (180°), the locking recess 51 and the first tooth 41 may be moved to the locking position for locking. This will be described in more detail below.

The second axis A2 may be disposed at a position spaced apart from the first axis A1 in the upward-downward direction. For example, the second axis A2 may be spaced downward from the first axis A1 and may be located in front of the first axis A1 (refer to FIG. 10).

Figure 10:
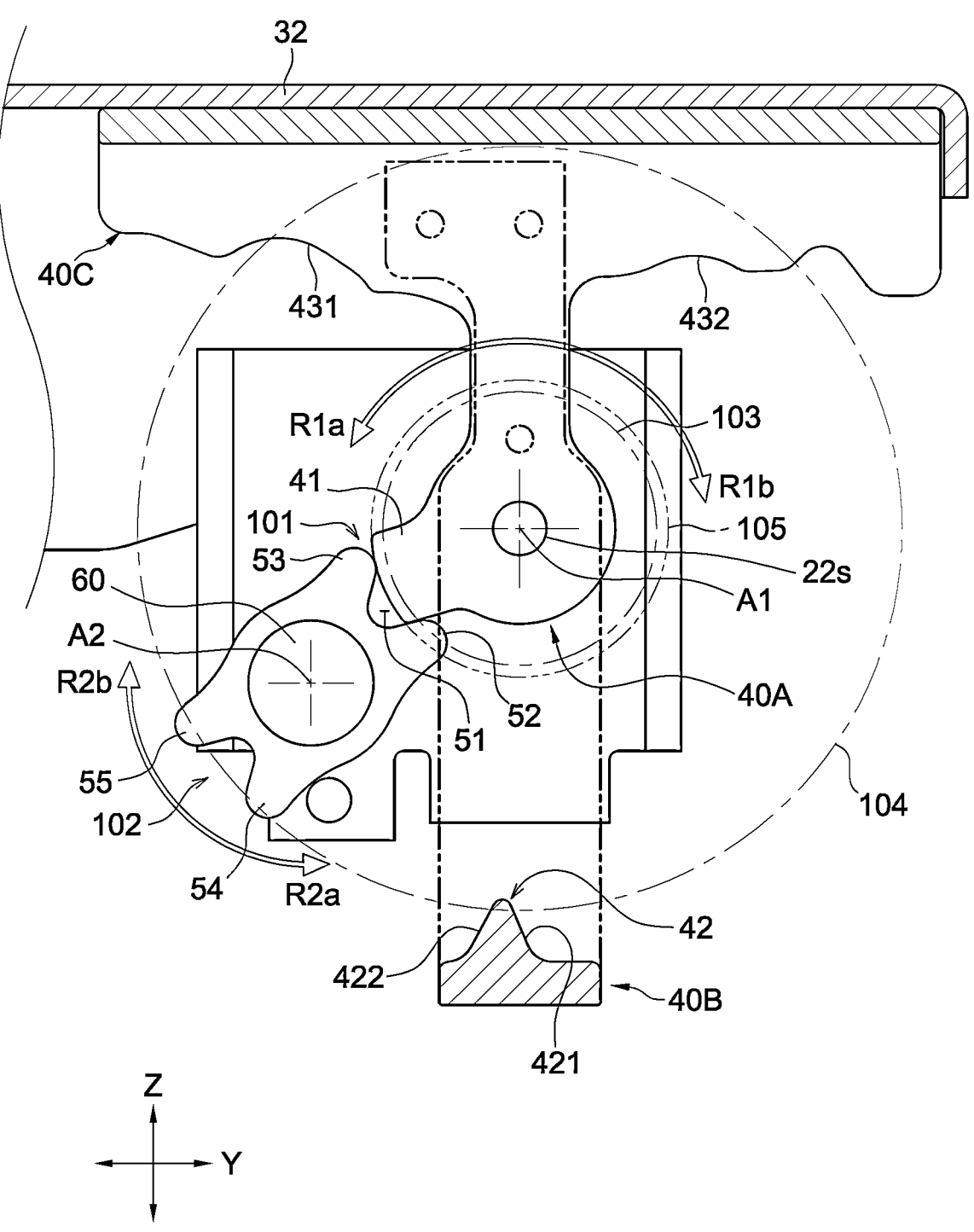

Two opposite rotational directions about the second axis A2 may be, respectively, a $2a^{th}$ rotational direction R2$a$ and a $2b^{th}$ rotational direction R2$b$. The cam member 50 may be rotated in the $2a^{th}$ rotational direction R2$a$ and the $2b^{th}$ rotational direction R2$b$, opposite the $2a^{th}$ rotational direction R2$a$, about the second axis A2. Referring to FIG. 10 showing the locking device 40, 50, and 60 viewed from the left, the $1a^{th}$ rotational direction R1$a$ and the $2a^{th}$ rotational direction R2$a$ may be rotational directions corresponding to the counterclockwise (CCW) direction, and the $1b^{th}$ rotational direction R1$b$ and the $2b^{th}$ rotational direction R2$b$ may be rotational directions corresponding to the clockwise (CW) direction.

Referring to FIG. 10, reference numeral 101 represents a first contact area in which the first tooth 41 may be in contact with the first contact cams (refer to 52 and 53), and reference numeral 102 represents a second contact area in which the second tooth 42 may be in contact with the second contact cams (refer to 54 and 55). The first contact area 101 and the second contact area 102 may be provided opposite each other with respect to the second axis A2. In detail, the first contact area 101 may be interposed between the first axis A1 and the second axis A2, and the second contact area 102 may be disposed opposite the first contact area 101 with respect to the second axis A2. The first contact area 101 may include the locking position.

Figure 8:
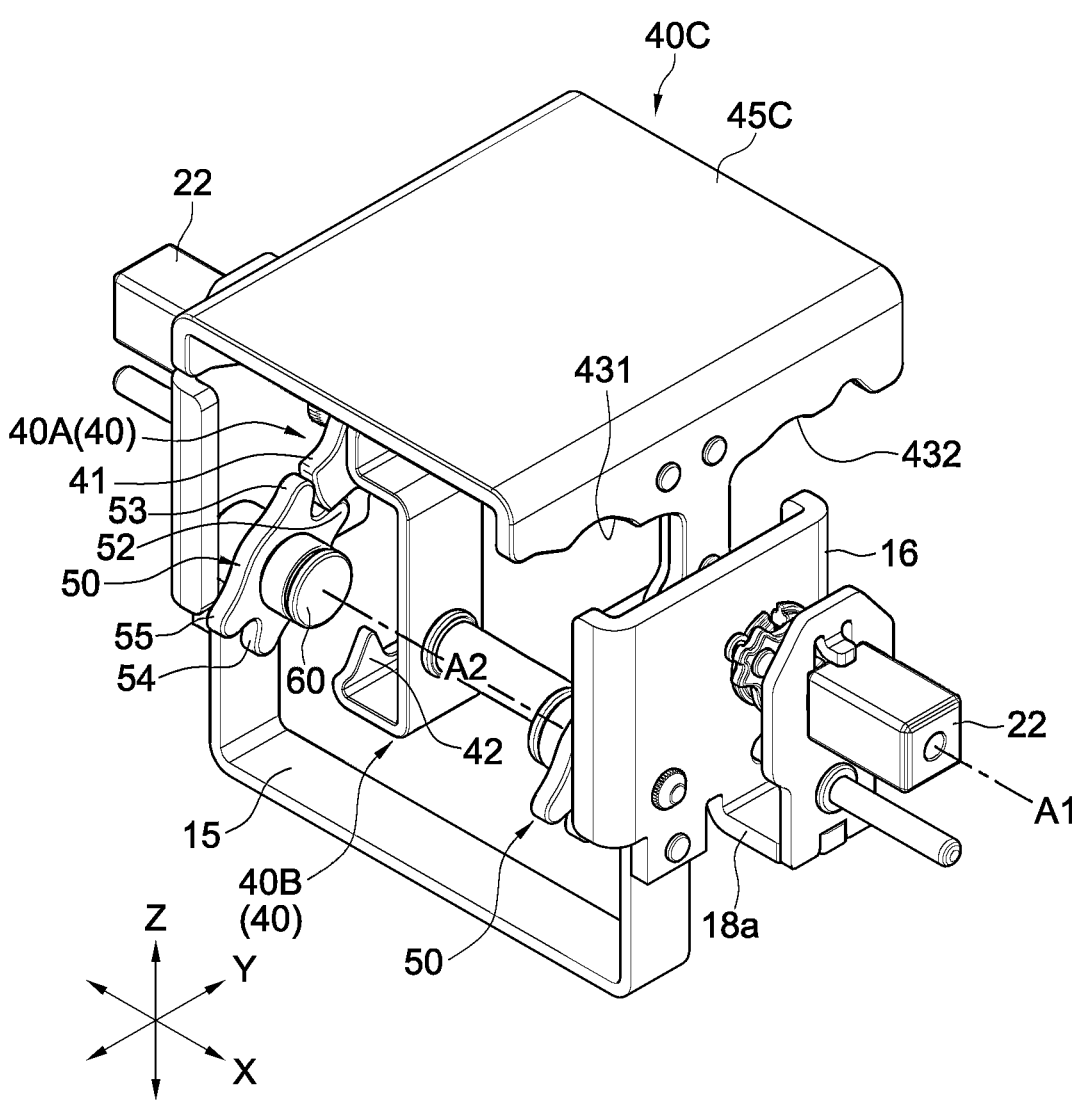
FIGS. 8 to 10 are, respectively, a perspective view, a cross-sectional perspective view, and a left cross-sectional view showing a locking device of the armrest assembly for vehicles according to the embodiment of the present disclosure.
Figure 9:
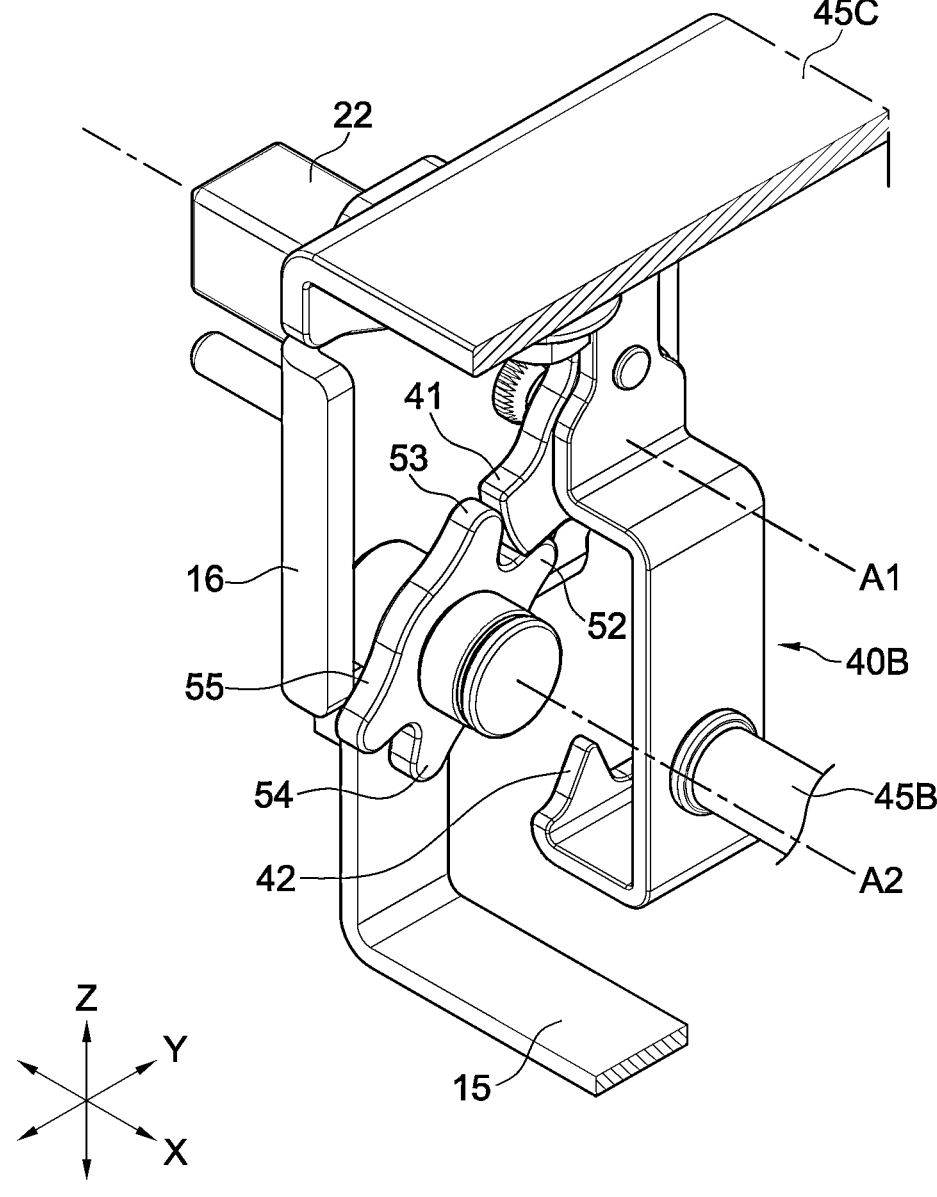

Referring to FIGS. 8 to 10, the cam member 50 may include a cam member main body disposed on the second axis A2, and the first contact cams (refer to 52 and 53) and the second contact cams (refer to 54 and 55) may be formed at two opposite sides of the cam member main body. In detail, the first contact cams (refer to 52 and 53) and the second contact cams (refer to 54 and 55) may be disposed opposite each other with respect to the second axis A2.

Each of the first contact cams (refer to 52 and 53) and the second contact cams (refer to 54 and 55) may protrude from the cam member main body. In other words, the cam member has two protrusions at one end, which are the first contact cams (52 and 53), and another two protrusions at the opposite end, which are the second contact cams (54 and 55). The first contact cams (refer to 52 and 53) may be formed in such a shape and positioned so that they can move and pass through the first contact area 101 when the cam member 50 is rotated, and the second contact cams (refer to 54 and 55) may be formed in such a shape and positioned so that they can move and pass through the second contact area 102 when the cam member 50 is rotated. The first contact cams may be composed of a $1a^{th}$ cam 52 and a $1b^{th}$ cam 53 formed adjacent to each other, and the second contact cams may be composed of a $2a^{th}$ cam 54 and a $2b^{th}$ cam 55 formed adjacent to each other. The $1a^{th}$ cam 52 may be spaced apart from the $1b^{th}$ cam 53 in the $2b^{th}$ rotational direction R2$b$ (CW), and the $1b^{th}$ cam 53 may be spaced apart from the $1a^{th}$ cam 52 in the $2a^{th}$ rotational direction R2$a$ (CCW). The $2a^{th}$ cam 54 may be spaced apart from the $2b^{th}$ cam 55 in the $2a^{th}$ rotational direction R2$a$ (CCW), and the $2b^{th}$ cam 55 may be spaced apart from the $2a^{th}$ cam 54 in the $2b^{th}$ rotational direction R2$b$ (CW).

Figure 11:
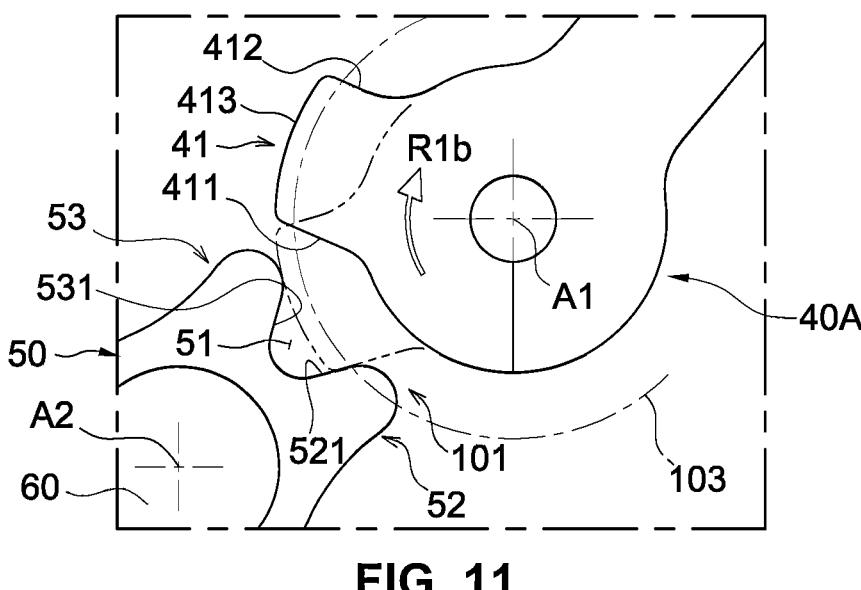
FIGS. 11 to 16 are views showing operation of the locking device on the basis of FIG. 10.

Referring to FIG. 10, the first contact cams may have a locking recess 51 formed between the $1a^{th}$ cam 52 and the $1b^{th}$ cam 53. As shown in FIG. 11, the locking recess 51 may be formed to have a $1a^{th}$ inner surface 521 facing in the $2a^{th}$ rotational direction R2$a$ (CCW) and a $1b^{th}$ inner surface 531 facing in the $2b^{th}$ rotational direction R2$b$ (CW). The locking recess 51 may be formed such that the interval between the $1a^{th}$ inner surface 521 and the $1b^{th}$ inner surface 531 gradually increases from the bottom of the recess to the entrance of the recess (i.e., toward a radially outward direction from the second axis A2). That is, the locking recess 51 may be formed in a shape that is gradually increased in size from the bottom of the recess to the entrance of the recess.

Figure 12:
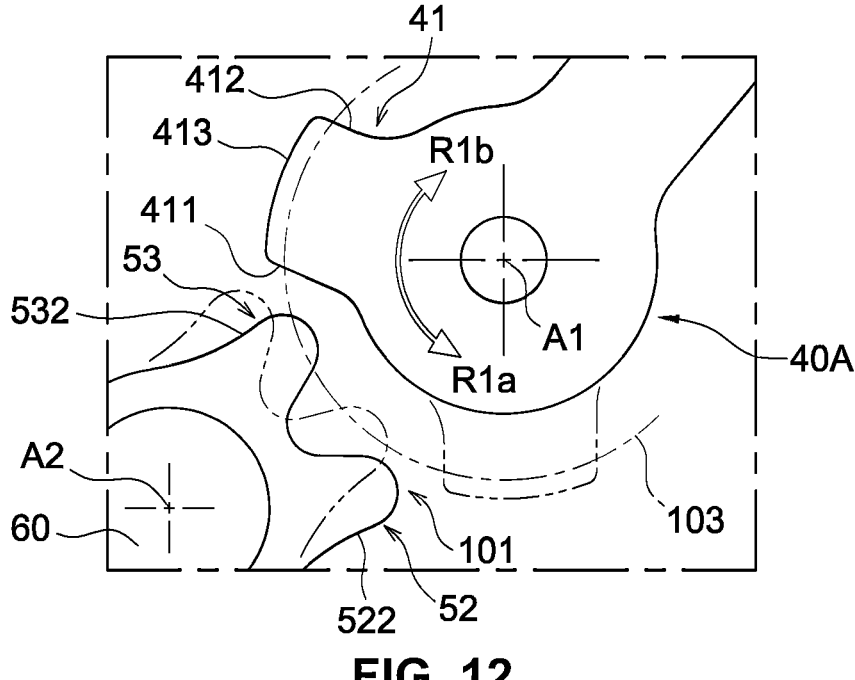

Referring to FIGS. 11 and 12, the $1a^{th}$ cam 52 may be formed to have a $1a^{th}$ cam inner surface (refer to 521) facing in the $2a^{th}$ rotational direction R2$a$ and a $1a^{th}$ cam outer surface 522 facing in the $2b^{th}$ rotational direction R2$b$, and the $1b^{th}$ cam 53 may be formed to have a $1b^{th}$ cam inner surface (refer to 531) facing in the $2b^{th}$ rotational direction R2$b$ and a $1b^{th}$ cam outer surface 532 facing in the $2a^{th}$ rotational direction R2$a$. The $1a^{th}$ cam inner surface of the $1a^{th}$ cam 52 may correspond to the $1a^{th}$ inner surface 521 of the locking recess 51, and the $1b^{th}$ cam inner surface of the $1b^{th}$ cam 53 may correspond to the $1b^{th}$ inner surface 531 of the locking recess 51. Each of a protruding tip portion of the $1a^{th}$ cam 52 and a protruding tip portion of the $1b^{th}$ cam 53 may be formed in a round shape. Thus, the $1a^{th}$ cam inner surface ($1a^{th}$ inner surface 521) may include one half of the round-shaped portion of the $1a^{th}$ cam 52, and the $1a^{th}$ cam outer surface 522 of the $1a^{th}$ cam 52 may include the remaining half of the round-shaped portion of the $1a^{th}$ cam 52. Similarly, the $1b^{th}$ cam inner surface ($1b^{th}$ inner surface 531) of the $1b^{th}$ cam 53 may include one half of the round-shaped portion of the $1b^{th}$ cam 53, and the $1b^{th}$ cam outer surface 532 of the $1b^{th}$ cam 53 may include the remaining half of the round-shaped portion of the $1b^{th}$ cam 53.

Figure 13:
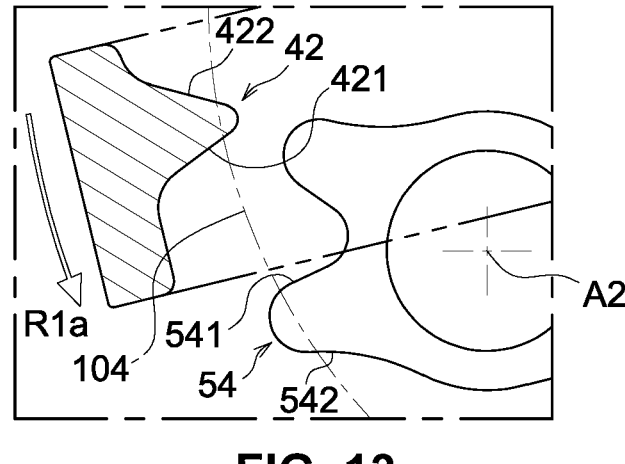
Figure 14:
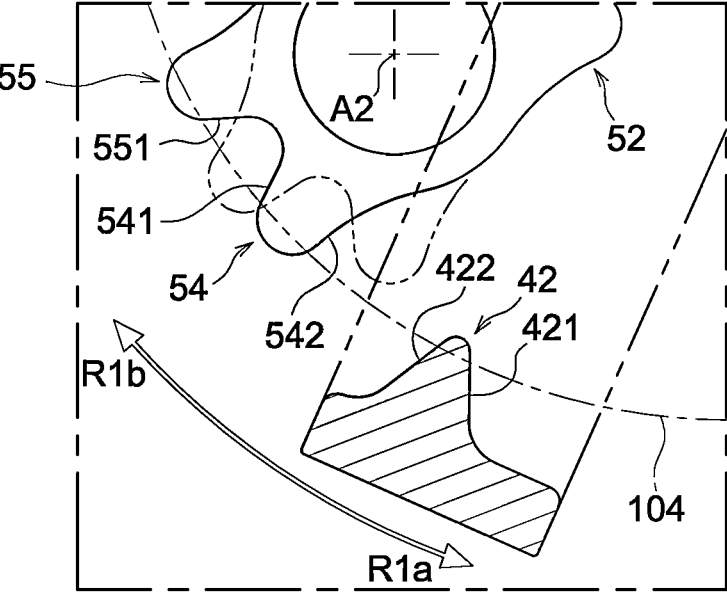
Figure 15:
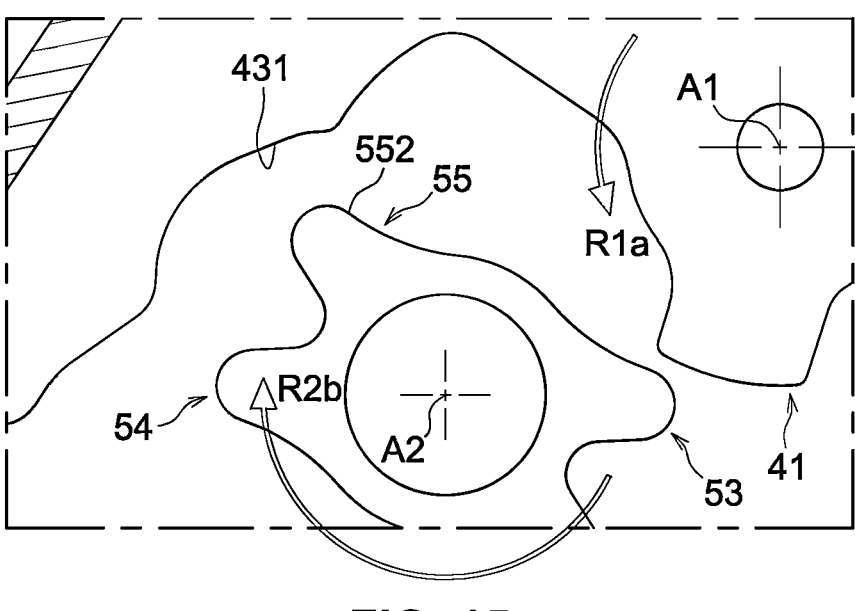

As shown in FIGS. 13 to 15, the $2a^{th}$ cam 54 may be formed to have a $2a^{th}$ cam inner surface 541 facing in the $2b^{th}$ rotational direction R2$b$ (CW) and a $2a^{th}$ cam outer surface 542 facing in the $2a^{th}$ rotational direction R2$a$ (CCW), and the $2b^{th}$ cam 55 may be formed to have a $2b^{th}$ cam inner surface 551 facing in the $2a^{th}$ rotational direction R2$a$ and a $2b^{th}$ cam outer surface 552 facing in the $2b^{th}$ rotational direction R2$b$. Each of a protruding tip portion of the $2a^{th}$ cam 54 and a protruding tip portion of the $2b^{th}$ cam 55 may be formed in a round shape. Thus, the $2a^{th}$ cam inner surface 541 of the $2a^{th}$ cam 54 may include one half of the round-shaped portion of the $2a^{th}$ cam 54, and the $2a^{th}$ cam outer surface 542 of the $2a^{th}$ cam 54 may include the remaining half of the round-shaped portion of the $2a^{th}$ cam 54. Similarly, the $2b^{th}$ cam inner surface 551 of the $2b^{th}$ cam 55 may include one half of the round-shaped portion of the $2b^{th}$ cam 55, and the $2b^{th}$ cam outer surface 552 of the $2b^{th}$ cam 55 may include the remaining half of the round-shaped portion of the $2b^{th}$ cam 55.

The first contact cams may be formed such that one or both the $1a^{th}$ cam 52 and the $1b^{th}$ cam 53 are located in the first contact area 101 in accordance with rotation of the cam member 50, and the second contact cams may be formed such that one or both the $2a^{th}$ cam 54 and the $2b^{th}$ cam 55 are located in the second contact area 102 in accordance with rotation of the cam member 50. Of course, both the $1a^{th}$ cam 52 and the $1b^{th}$ cam 53 may be located outside the first contact area 101, and both the $2a^{th}$ cam 54 and the $2b^{th}$ cam 55 may also be located outside the second contact area 102 in accordance with the rotation of the cam member 50. In addition, the first contact cams may be formed such that, when the posture of the armrest 30 is the first posture (0°), the $1a^{th}$ cam 52 is located in the first contact area 101 and the locking recess 51 is located at the locking position in the first contact area 101. In addition, the second contact cams may be formed such that, when the posture of the armrest 30 is the first posture (0°), at least the $2a^{th}$ cam 54 among the $2a^{th}$ cam 54 and the $2b^{th}$ cam 55 is located in the second contact area 102.

Referring to FIGS. 7 and 10, the lock 40A may be disposed on the first axis A1, and the contact element 40B and the operation cam 40C may be connected to the lock 40A.

The first tooth 41 may be formed to protrude from one side of the periphery of the lock 40A and to be movable along a first path 103 passing through the first contact area 101 in accordance with rotation of the armrest 30, and thus may contact the first contact cams 52 and 53 for control of rotation of the cam member 50 in the first contact area 101. In one example, the first tooth 41 may rotate the cam member 50 through contact with the first contact cams 52 and 53, thereby moving the second contact cams 54 and 55 into or out of the second contact area 102. Because the first contact area 101 is interposed between the first axis A1 and the second axis A2, when the posture of the armrest 30 is changed to the first posture (0°) and thus the first tooth 41 is moved to the locking position in the first contact area 101, the lock 40A may be disposed so that the tooth end of the first tooth 41 faces forward and downward.

The contact element 40B may be formed to have a first end portion and a second end portion disposed opposite each other. The first end portion of the contact element 40B may be coupled to the lock 40A, and the second end portion of the contact element 40B may be disposed opposite the armrest frame 32 with respect to the first axis A1. The second tooth 42 may be provided at the second end portion of the contact element 40B. The second tooth 42 may be formed to be movable along a second path 104 passing through the second contact area 102 in accordance with rotation of the armrest 30, and the tooth end thereof may be formed to face the first axis A1, whereby the second tooth 42 may contact the second contact cams 54 and 55 for control of rotation of the cam member 50 in the second contact area 102. In one example, the second tooth 42 may rotate the cam member 50 through contact with the second contact cams 54 and 55, thereby moving the first contact cams 52 and 53 into or out of the first contact area 101. The contact element 40B may be formed such that, when the posture of the armrest 30 is the first posture (0°), the second tooth 42 is disposed below the first axis A1 while being spaced apart from the second contact cams 54 and 55 in the $1a^{th}$ rotational direction R1a.

The operation cam 40C may be disposed opposite the second tooth 42 with respect to the first axis A1. The operation cam 40C may be formed in a shape in which the cam rail 43 extends from the lock 40A, and may be coupled to the lower surface of the armrest frame 32 by means of a coupling member 45C extending from the cam rail 43. The operation cam 40C may be formed such that, when the posture of the armrest 30 is the first posture (0°), contact rails 431 and 432 defining a cam surface of the cam rail 43 face downward.

Referring to FIGS. 11, 12, 17D, and 19D, when the occupant rotates the armrest 30 in order to change the posture of the armrest 30, for example, from the first posture (0°) to the second posture (−73°) or the third posture (180°), it is possible that the first tooth 41 does not contact the first contact cams 52 and 53, or the second tooth 42 does not contact the second contact cams 54 and 55 depending on the positional relationship between the first tooth 41 and the first contact cams 52 and 53 and the positional relationship between the second tooth 42 and the second contact cams 54 and 55. In one example, when the first contact cams 52 and 53 are located outside the first contact area 101 and the second contact cams 54 and 55 are located outside the second contact area 102 due to rotation of the cam member 50, the first tooth 41 may not contact the first contact cams 52 and 53, and the second tooth 42 may not contact the second contact cams 54 and 55. In this case, the cam rail 43 may approach the cam member 50, and thus may contact the first contact cams 52 and 53 located outside the first contact area 101, thereby moving the second contact cams 54 and 55 into the second contact area 102 from the outside of the second contact area 102, or may contact the second contact cams 54 and 55 located outside the second contact area 102, thereby moving the first contact cams 52 and 53 into the first contact area 101 from the outside of the first contact area 101.

Referring to FIGS. 10 and 11, the first tooth 41 may be formed to have a $1a^{th}$ contact side surface 411 facing in the $1a^{th}$ rotational direction R1a, a $1b^{th}$ contact side surface 412 facing in the $1b^{th}$ rotational direction R1b, and a contact end surface 413 defining the tooth end of the first tooth 41 between the $1a^{th}$ contact side surface 411 and the $1b^{th}$ contact side surface 412. When the posture of the armrest 30 is changed to the first posture (0°) and thus the first tooth 41 is received in the locking recess 51 at the locking position in the first contact area 101, the $1a^{th}$ contact side surface 411 may be in contact with the $1a^{th}$ cam inner surface 521 of the $1a^{th}$ cam 52, which corresponds to the $1a^{th}$ inner surface of the locking recess 51, and the contact end surface 413 may be in contact with the $1b^{th}$ cam inner surface 531 of the $1b^{th}$ cam 53, which corresponds to the $1b^{th}$ inner surface of the locking recess 51.

In this configuration, when the first tooth 41 is received (i.e., locked) in the locking recess 51, the $1a^{th}$ contact side surface 411 is in contact with the $1a^{th}$ cam inner surface 521 and the contact end surface 413 is in contact with the $1b^{th}$ cam inner surface 531. in this posture, when rotational force in the $1a^{th}$ rotational direction R1a, which is generated by the weight of the armrest 30, operation by the occupant, occupant load (load applied to the armrest when the occupant uses the armrest in a manner of, for example, leaning on or placing his/her arm on the armrest in the first posture), or the like, is transmitted to the cam member 50 via contact with the first tooth 41 of the rotator 40, the force is distributed to the $1a^{th}$ cam 52 and the $1b^{th}$ cam 53 through their respective inner surfaces (the $1a^{th}$ inner surface 521 and the $1b^{th}$ inner surface 531 of the locking recess). As a result, the force is exerted on the $1a^{th}$ cam 52 and the $1b^{th}$ cam 53 in opposite rotational directions (exerted on the $1a^{th}$ cam 52 in the $2b^{th}$ rotational direction R2b (CW) and on the $1b^{th}$ cam 53 in the $2a^{th}$ rotational direction R2a (CCW)), effectively preventing the cam member 50 from rotating in the $2b^{th}$ rotational direction R2b (CW). Further, rotation of the armrest 30 in the $1a^{th}$ rotational direction R1a (CCW) may be restricted, and thus the armrest 30 may be maintained in the first posture (0°).

As shown in FIG. 10, the contact end surface 413 of the first tooth 41 may be formed in an arc shape that corresponds to an imaginary inscribed circle 105 centered on the first axis A1 so as to be inscribed in the inscribed circle 105. When the first tooth 41 is received in the locking recess 51, the $1b^{th}$ cam inner surface 531 of the $1b^{th}$ cam 53 may be in point contact with the contact end surface 413 outside the inscribed circle 105. To this end, while the $1a^{th}$ cam 52 is located in the first contact area 101, the $1b^{th}$ cam 53 may be located outside the first contact area 101, and a contact point between the contact end surface 413 and the $1b^{th}$ cam inner surface 531 may be located on the inscribed circle 105.

In this configuration, when the first tooth 41 is received in the locking recess 51, the $1b^{th}$ cam inner surface 531 is in point contact with the contact end surface 413 outside the inscribed circle 105, as shown in FIG. 11. When the armrest 30 is rotated from the first posture (0°) in the $1b^{th}$ rotational direction R$1b$ (CW), the first tooth 41 may be moved along the first path 103 from the inside of the first contact area 101 to the outside of the first contact area 101 without interference with the locking recess 51, and thus may be separated (unlocked) from the locking recess 51.

As described above, when the armrest 30 is in the first posture, the armrest assembly according to the embodiment of the present disclosure may restrict the armrest 30 from further rotating in the $1a^{th}$ rotational direction R$1a$ (CCW) for use of the armrest by the occupant, but may allow the armrest 30 to rotate in the $1b^{th}$ rotational direction R$1b$ (CW) for unlocking of the armrest 30.

In order to transmit the rotational force of the armrest 30 to the cam member 50 in a contact manner to control rotation of the cam member 50, the first tooth 41 may contact the first contact cams 52 and 53 in the first contact area 101 depending on the positional relationship with the first contact cams 52 and 53 (refer to FIGS. 11 and 12). For example, the first tooth 41 may be moved along the first path 103 by rotating in the $1a^{th}$ rotational direction R$1a$ toward the first contact area 101, and thus the $1a^{th}$ contact side surface 411 of the first tooth 41 may be brought into contact with the $1a^{th}$ cam inner surface 521 of the $1a^{th}$ cam 52 or the $1b^{th}$ cam outer surface 532 of the $1b^{th}$ cam 53. Alternatively, the first tooth 41 may be moved along the first path 103 by rotating in the $1b^{th}$ rotational direction R$1b$ toward the first contact area 101, and thus the $1b^{th}$ contact side surface 412 of the first tooth 41 may be brought into contact with the $1a^{th}$ cam outer surface 522 of the $1a^{th}$ cam 52 or the $1b^{th}$ cam inner surface 531 of the $1b^{th}$ cam 53. Alternatively, the first tooth 41 may be inserted into the locking recess 51, whereby the $1a^{th}$ contact side surface 411 of the first tooth 41 may be brought into contact with the $1a^{th}$ cam inner surface of the $1a^{th}$ cam 52 (the $1a^{th}$ inner surface 521 of the locking recess), and the contact end surface 413 of the first tooth 41 may be brought into contact with the $1b^{th}$ cam inner surface of the $1b^{th}$ cam 53 (the $1b^{th}$ inner surface 531 of the locking recess).

Referring to FIG. 10, the second tooth 42 may be formed to have a $2a^{th}$ contact side surface 421 facing in the $1a^{th}$ rotational direction R$1a$ and a $2b^{th}$ contact side surface 422 facing in the $1b^{th}$ rotational direction R$1b$. Referring to FIGS. 13 and 14, in order to transmit the rotational force of the armrest 30 to the cam member 50 in a contact manner to control rotation of the cam member 50, the second tooth 42 may contact the second contact cams 54 and 55 in the second contact area 102 in accordance with the positional relationship with the second contact cams 54 and 55. For example, the second tooth 42 may be moved along the second path 104 by rotation in the $1a^{th}$ rotational direction R$1a$ toward the second contact area 102, and thus the $2a^{th}$ contact side surface 421 of the second tooth 42 may be brought into contact with the $2a^{th}$ cam inner surface 541 of the $2a^{th}$ cam 54 or the $2b^{th}$ cam outer surface 552 of the $2b^{th}$ cam 55. Alternatively, the second tooth 42 may be moved along the second path 104 by rotation in the $1b^{th}$ rotational direction R$1b$ toward the second contact area 102, and thus the $2b^{th}$ contact side surface 422 of the second tooth 42 may be brought into contact with the $2a^{th}$ cam outer surface 542 of the $2a^{th}$ cam 54 or the $2b^{th}$ cam inner surface 551 of the $2b^{th}$ cam 55.

When the armrest 30 is rotated by a set angle from the first posture (0°) in the $1b^{th}$ rotational direction R$1b$, the first tooth 41 enters a ready posture in which the first tooth 41 is separated from the locking recess 51 (ready posture for posture change, which may be referred to as an unlocked posture because the first tooth 41 is separated from the locking recess 51) (refer to FIG. 11). In this posture, if second tooth 42 moves along the second path 104 by rotation in the $1b^{th}$ rotational direction R$1b$ toward the second contact area 102, the $2b^{th}$ contact side surface 422 may be brought into contact with the $2a^{th}$ cam outer surface 542 of the $2a^{th}$ cam 54 (refer to FIGS. 13 and 17(B)). In this case, the second tooth 42 may have such a relationship with the cam member 50 that, when the second tooth 42 rotates the cam member 50 by a predetermined angle in the $2b^{th}$ rotational direction R$2b$, the $1a^{th}$ cam 52 located in the first contact area 101 is moved out of the first contact area 101 and the $1b^{th}$ cam 53 located outside the first contact area 101 is moved into the first contact area 101. For reference, the set angle may be 40 degrees.

Referring to FIG. 10, the cam rail 43 may be formed to have a first contact rail 431 disposed at a side facing in the $1a^{th}$ rotational direction R$1a$ and a second contact rail 432 disposed at a side facing in the $1b^{th}$ rotational direction R$1b$. Each of the first contact rail 431 and the second contact rail 432 may define a cam surface of the cam rail 43.

Figure 16:
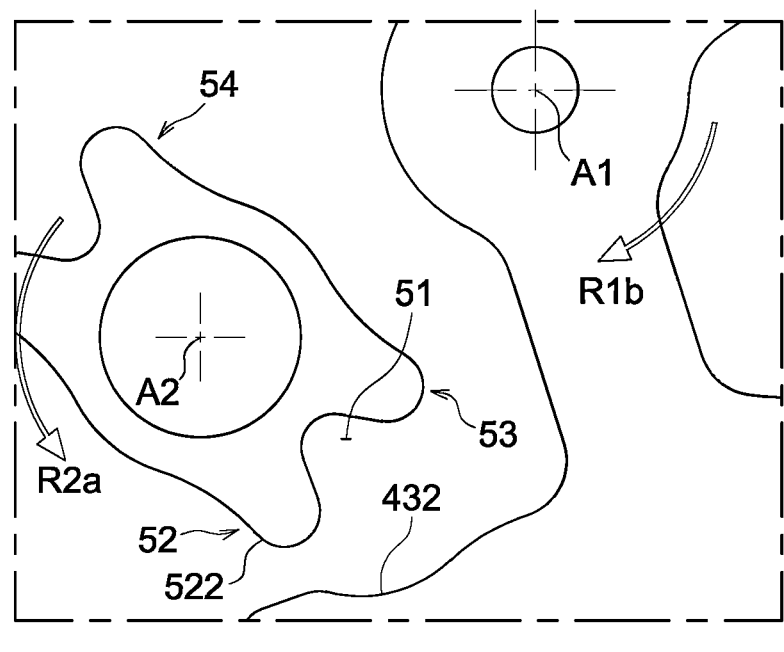

Referring to FIGS. 15 and 16, in order to transmit the rotational force of the armrest 30 to the cam member 50 in a contact manner to control rotation of the cam member 50, the cam rail 43 may contact the first contact cams 52 and 53 or the second contact cams 54 and 55 depending on the positional relationship with the first contact cams 52 and 53 or the second contact cams 54 and 55.

For example, when the armrest 30 is rotated in the $1a^{th}$ rotational direction R$1a$ for posture change from the first posture (0°) to the second posture (−73°), the first contact rail 431 may approach the cam member 50, and may be brought into contact with the $2b^{th}$ cam outer surface 552 of the $2b^{th}$ cam 55 located outside the second contact area 102. In this case, the first contact rail 431 may be formed to rotate the cam member 50 in the $2a^{th}$ rotational direction R$2a$ so that the $1a^{th}$ cam 52 located outside the first contact area 101 is moved into the first contact area 101. Alternatively, when the armrest 30 is rotated in the $1b^{th}$ rotational direction R$1b$ for posture change from the first posture (0°) to the third posture (180°), the second contact rail 432 may approach the cam member 50, and may be brought into contact with the $1a^{th}$ cam outer surface 522 of the $1a^{th}$ cam 52 located outside the first contact area 101. In this case, the second contact rail 432 may be formed to rotate the cam member 50 in the $2a^{th}$ rotational direction R$2a$ so that only the $2a^{th}$ cam 54 among the $2a^{th}$ cam 54 and the $2b^{th}$ cam 55 located outside the second contact area 102 is moved into the second contact area 102.

Although not shown in detail in the drawings, the hinge shaft 60 may be configured to have a free-stop function, and thus may be freely maintained in a stationary state at any angle after rotation. In other words, the free-stop function is a feature that allows the rotation to be stopped and held in place at any position without the need for external locking mechanisms or brakes. To this end, the hinge shaft 60 may include a friction shaft and a friction guide. The friction shaft of the hinge shaft 60 may be rotatably provided at the fixed bracket 16, and may include a coupling portion and a friction portion centered on the second axis A2. The coupling portion and the friction portion may be arranged in the leftward-rightward direction, and the friction portion may have a circular cross-section. The cam member 50 may be coupled at a central portion thereof to the coupling portion of the hinge shaft 60, and thus may be rotated about the second axis A2 together with the hinge shaft 60. The friction guide of the hinge shaft 60 may be provided at the fixed bracket 16 in a stationary state, and may have a friction hole formed therein to receive the circular friction portion of the friction shaft. When the friction shaft is rotated, the inner periphery of the friction hole may be brought into friction contact with the outer periphery of the friction portion of the friction shaft.

The process of changing the posture of the armrest 30 is shown in FIGS. 17A to 20E. In FIGS. 17A to 20E, the second contact cams (refer to 54 and 55) are colored in order to be easily distinguished from the first contact cams (refer to 52 and 53). The operation of the armrest assembly according to the embodiment of the present disclosure will be described with reference to these drawings.

Figures 17A, 17B, 17C, 17D, 17E:
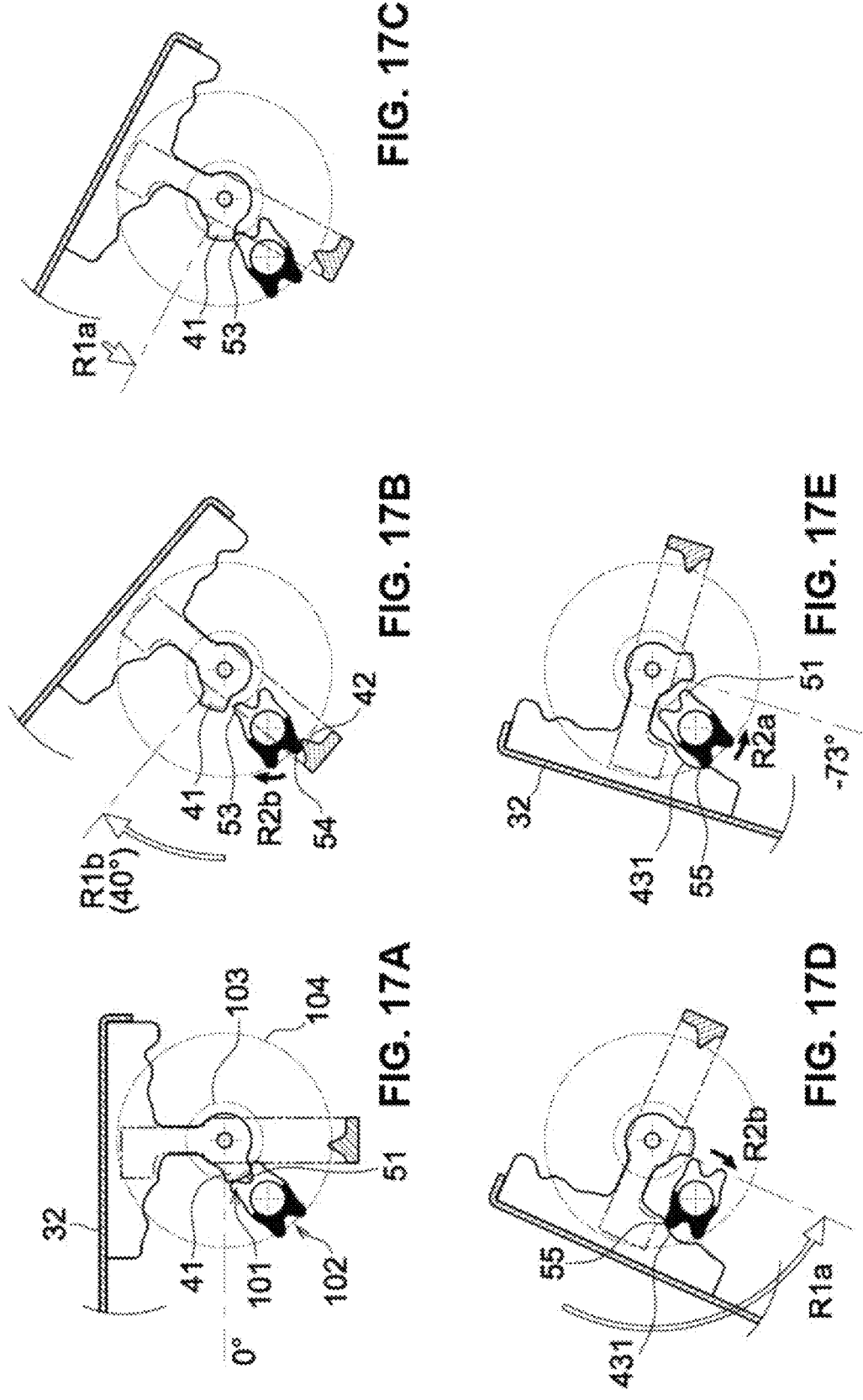

In order to change the posture of the armrest 30 from the first posture (0°) (refer to FIG. 17(A)) to the second posture (−73°), the armrest 30 in the first posture may be rotated by an angle, for example a predetermined angle 40°, in the 1b$^{th}$ rotational direction R1$b$. Due to such rotation of the armrest 30, the first tooth 41 is moved by rotation in the 1b$^{th}$ rotational direction R1$b$ and is separated from the locking recess 51, whereby the armrest 30 enters the ready posture (refer to FIG. 17(B)). At this time, the second tooth 42 is moved in the 1b$^{th}$ rotational direction R1$b$, and the 2b$^{th}$ contact side surface 422 thereof is brought into contact with the 2a$^{th}$ cam outer surface 542 of the 2a$^{th}$ cam 54, thereby rotating the cam member 50 in the 2b$^{th}$ rotational direction R2$b$ so that the 1a$^{th}$ cam 52 is located outside the first contact area 101 and the 1b$^{th}$ cam 53 is located in the first contact area 101.

Subsequently, the armrest 30 in the ready posture may be rotated in the 1a$^{th}$ rotational direction R1$a$. In this case, when the posture of the armrest 30 becomes the second posture (−73°), the armrest 30 is restricted from further rotating beyond the second posture by a contact with the front stopper 18$a$.

In the process in which the posture of the armrest 30 is changed from the ready posture to the second posture, the second tooth 42 is moved by rotation in the 1a$^{th}$ rotational direction R1$a$ and is separated from the second contact area 102. In addition, the first tooth 41 is moved to the first contact area 101 in which the 1b$^{th}$ cam 53 is located, and the 1a$^{th}$ contact side surface 411 thereof is brought into contact with the 1b$^{th}$ cam outer surface 532 of the 1b$^{th}$ cam 53 (refer to FIG. 17(C)). This allows the cam member 50 to rotate in the 2b$^{th}$ rotational direction R2$b$ so that the first contact cams 52 and 53 are located outside the first contact area 101 and the second contact cams 54 and 55 are located outside the second contact area 102. After the 1a$^{th}$ contact side surface 411 contacts the 1b$^{th}$ cam outer surface 532, the first tooth 41 is continuously moved in the 1a$^{th}$ rotational direction R1$a$ and is separated from the first contact area 101. In addition, the first contact rail 431 of the cam rail 43 approaches the 2b$^{th}$ cam 55 outside the second contact area 102 (refer to FIG. 17(D)) and is brought into contact with the 2b$^{th}$ cam outer surface 552 of the 2b$^{th}$ cam 55, thereby rotating the cam member 50 in the 2a$^{th}$ rotational direction R2$a$ so that the 1a$^{th}$ cam 52 is located in the first contact area 101 (refer to FIG. 17(E)).

Figures 18A, 18B, 18C, 18D, 18E:
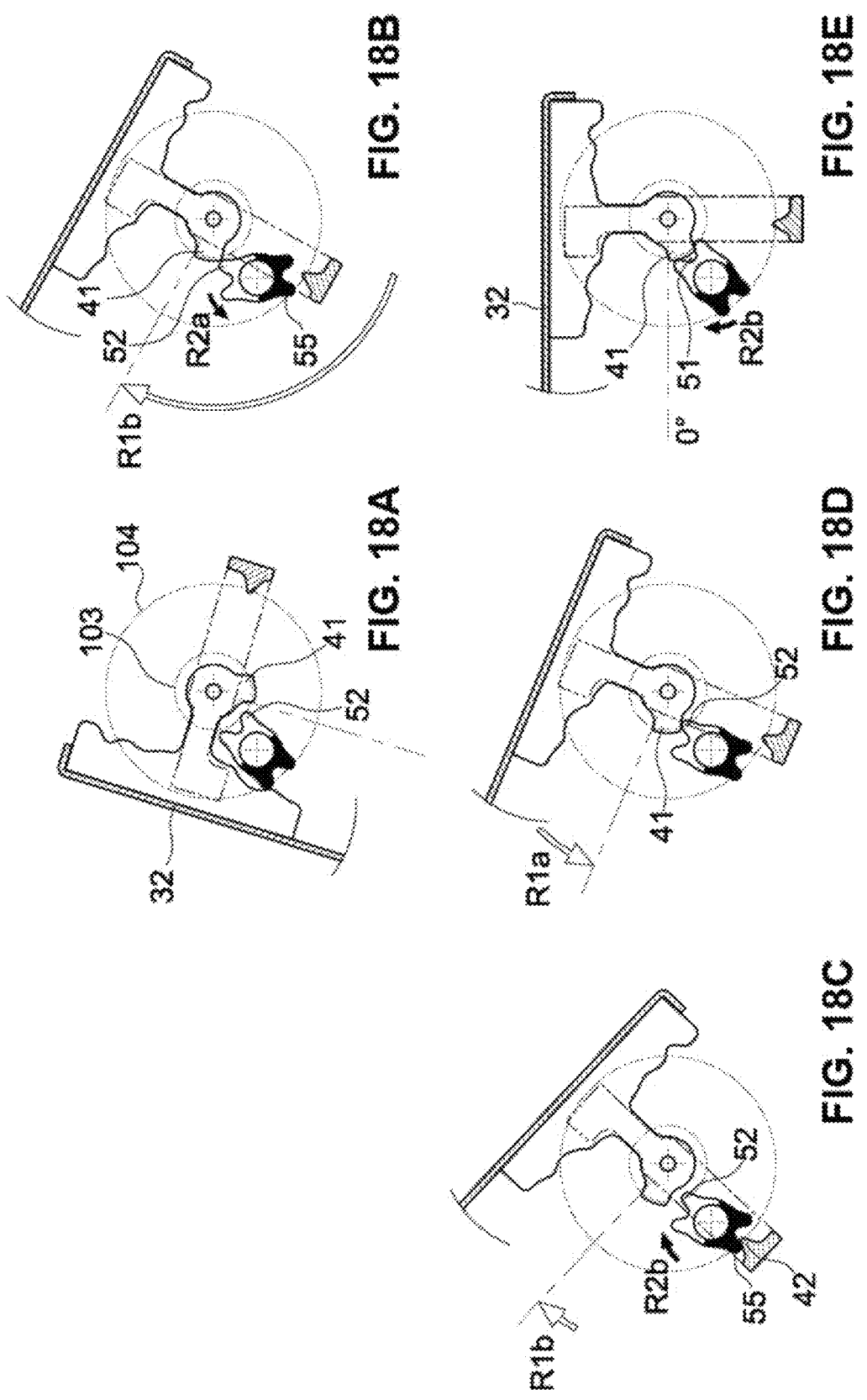

In order to change the posture of the armrest 30 from the second posture (−73°) (refer to FIG. 18(A)) to the first posture (0°), the armrest 30 in the second posture may be rotated in the 1b$^{th}$ rotational direction R1$b$. The armrest 30 is rotated until the armrest 30 enters the ready posture.

In the process in which the posture of the armrest 30 is changed from the second posture to the ready posture, the first tooth 41 may be moved by rotation in the 1b$^{th}$ rotational direction R1$b$ toward the first contact area 101 in which the 1a$^{th}$ cam 52 is located, and the 1b$^{th}$ contact side surface 412 thereof is brought into contact with the 1a$^{th}$ cam outer surface 522 of the 1a$^{th}$ cam 52 (refer to FIG. 18(B)), thereby rotating the cam member 50 in the 2a$^{th}$ rotational direction R2$a$ so that the 2a$^{th}$ cam 54 is located outside the second contact area 102 and the 2b$^{th}$ cam 55 is located in the second contact area 102. After the 1b$^{th}$ contact side surface 412 contacts the 1a$^{th}$ cam outer surface 522, the first tooth 41 is continuously moved in the 1b$^{th}$ rotational direction R1$b$ and is separated from the first contact area 101. In addition, the second tooth 42 is moved in the 1b$^{th}$ rotational direction R1$b$ toward the second contact area 102 in which the 2b$^{th}$ cam 55 is located, and the 2b$^{th}$ contact side surface 422 thereof is brought into contact with the 2b$^{th}$ cam inner surface 551 of the 2b$^{th}$ cam 55, thereby rotating the cam member 50 in the 2b$^{th}$ rotational direction R2$b$ so that the 1a$^{th}$ cam 52 is located in the first contact area 101 and the 1b$^{th}$ cam 53 is located outside the first contact area 101 (refer to FIG. 18(C)).

Subsequently, when the armrest 30 in the ready posture is rotated 40° in the 1a$^{th}$ rotational direction R1$a$, the posture of the armrest 30 may be changed to the first posture (0°). In this process, the first tooth 41 is moved to the first contact area 101 in which the 1a$^{th}$ cam 52 is located, and the 1a$^{th}$ contact side surface 411 thereof is brought into contact with the 1a$^{th}$ cam inner surface 521 of the 1a$^{th}$ cam 52 (refer to FIG. 18(D)), thereby rotating the cam member 50 in the 2b$^{th}$ rotational direction R2$b$ so that the locking recess 51 is moved to the locking position. Accordingly, the first tooth 41 is inserted into the locking recess 51 at the locking position (refer to FIG. 18(E)). When the first tooth 41 is inserted into the locking recess 51 in this way, the armrest 30 is restricted from further rotating in the 1a$^{th}$ rotational direction R1$a$, with a result that the posture change of the armrest 30 to the first posture (0°) is completed.

Figures 19A, 19B, 19C, 19D, 19E:
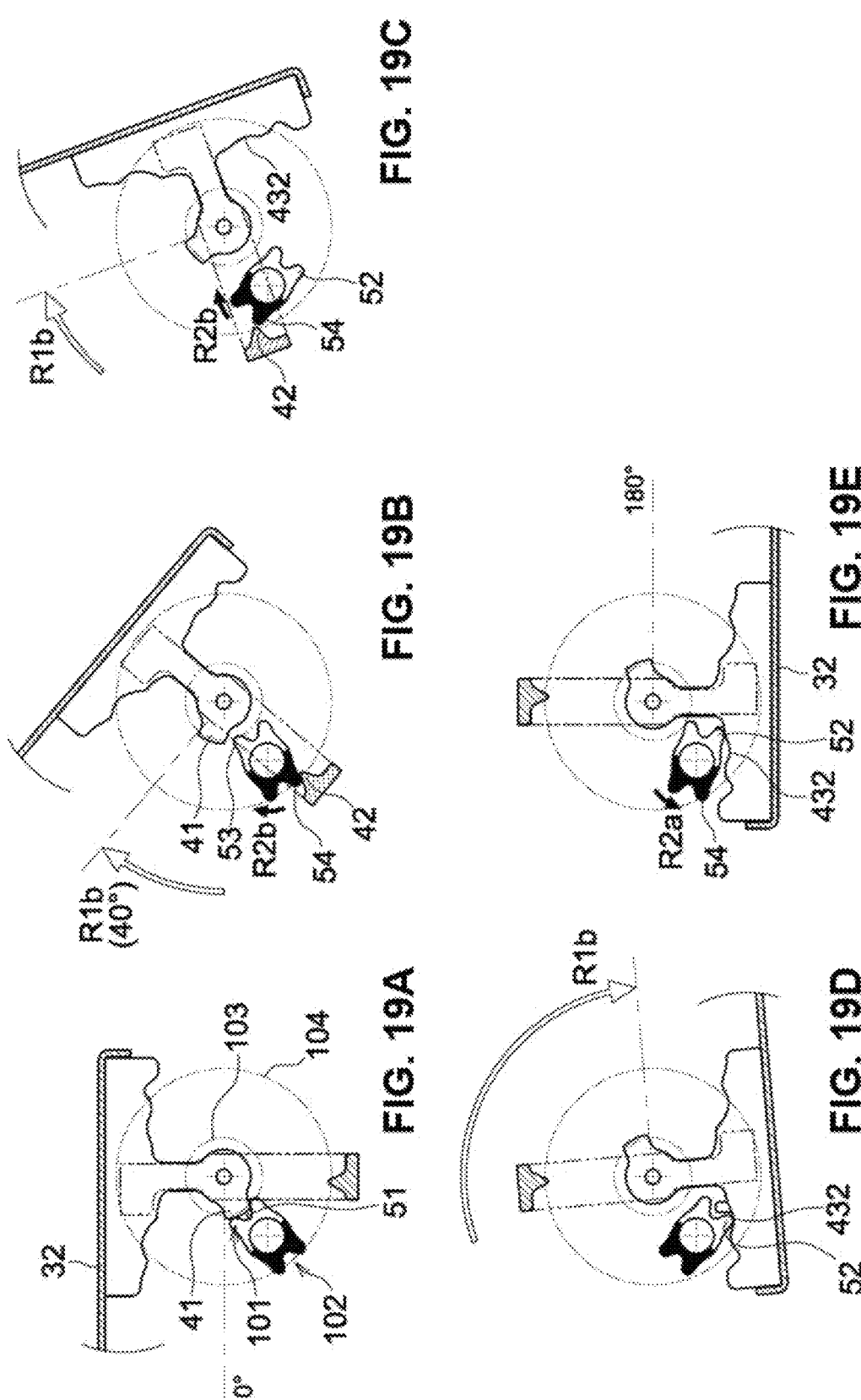

In order to change the posture of the armrest 30 from the first posture (0°) (refer to FIG. 19(A)) to the third posture (180°), the armrest 30 in the first posture is rotated 180° in the 1b$^{th}$ rotational direction R1$b$. Then, the posture of the armrest 30 is changed to the third posture via the ready posture, and the armrest 30 is restricted from further rotating in the 1b$^{th}$ rotational direction R1$b$ by a contact with the rear stopper 18$b$.

The process in which the armrest 30 enters the ready posture (refer to FIG. 19(B)) during the posture change of the armrest 30 from the first posture to the third posture is identical to the process in which the armrest 30 enters the ready posture during the posture change of the armrest 30 from the first posture to the second posture (−73°).

In the process in which the posture of the armrest 30 is changed from the ready posture to the third posture, the first tooth 41 separated from the locking recess 51 is moved by rotation in the 1b$^{th}$ rotational direction R1$b$ and is separated from the first contact area 101, and the second tooth 42, the 2b$^{th}$ contact side surface 422 of which is in contact with the 2a$^{th}$ cam outer surface 542 of the 2a$^{th}$ cam 54, is moved in the 1b$^{th}$ rotational direction R1$b$ and is separated from the second contact area 102 (refer to FIG. 19(C)). In addition, the second contact rail 432 of the cam rail 43 approaches the $1a^{th}$ cam 52 outside the first contact area 101 (refer to FIG. 19(D)) and is brought into contact with the $1a^{th}$ cam outer surface 522 of the $1a^{th}$ cam 52, thereby rotating the cam member 50 in the $2a^{th}$ rotational direction R2a so that the $2a^{th}$ cam 54 is located in the second contact area 102 and the $2b^{th}$ cam 55 is located outside the second contact area 102 (refer to FIG. 19(E)).

Figures 20A, 20B, 20C, 20D, 20E:
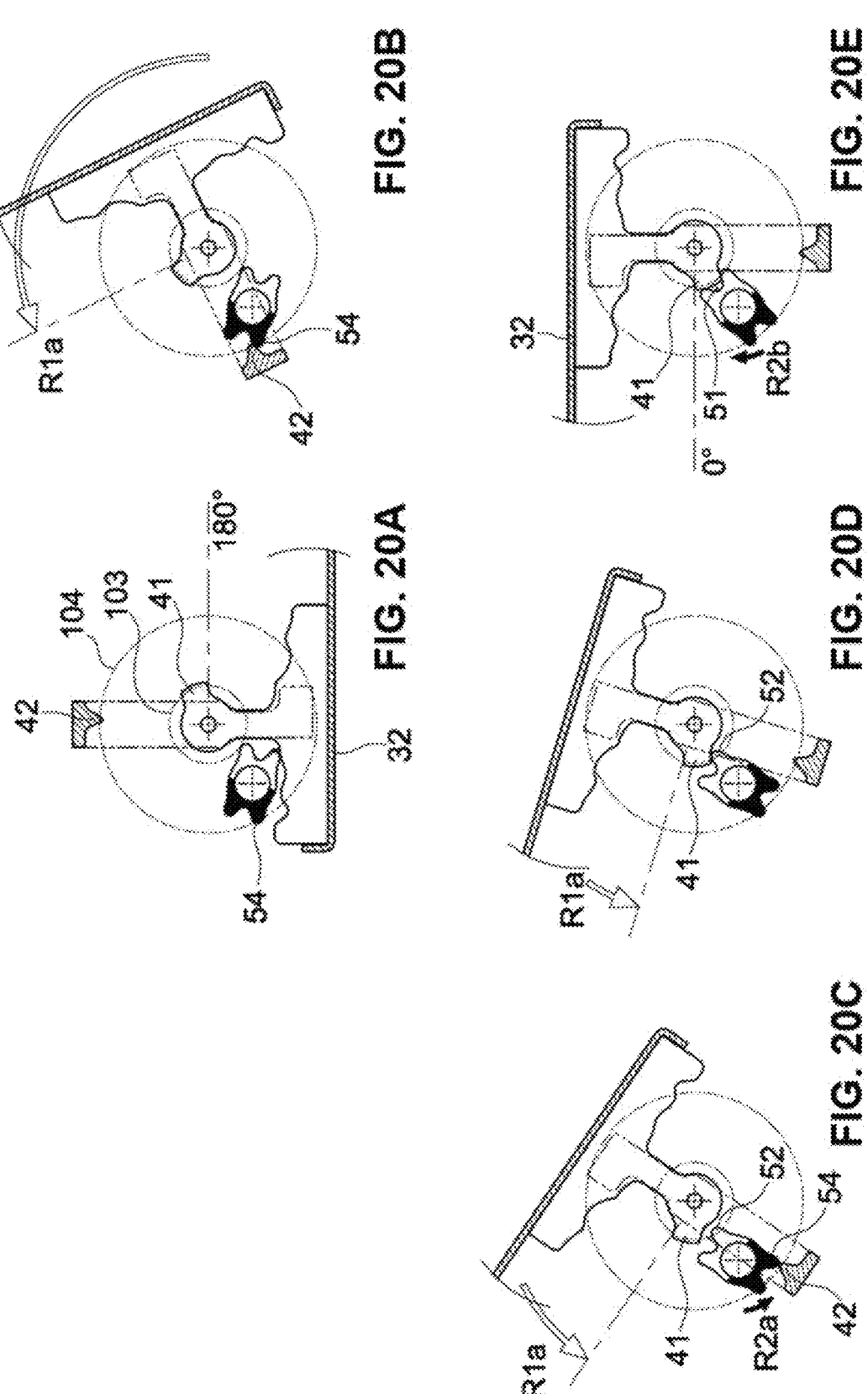

In order to change the posture of the armrest 30 from the third posture (180°) (refer to FIG. 20(A)) to the first posture (0°), the armrest 30 in the third posture is rotated 180° in the $1a^{th}$ rotational direction R1a. Then, the posture of the armrest 30 is changed to the first posture via the ready posture.

In the process in which the posture of the armrest 30 is changed from the third posture to the ready posture, the first tooth 41 is moved in the $1a^{th}$ rotational direction R1a. In addition, the second tooth 42 is moved in the $1a^{th}$ rotational direction R1a toward the second contact area 102 in which the $2a^{th}$ cam 54 is located, and the $2a^{th}$ contact side surface 421 thereof is brought into contact with the $2a^{th}$ cam inner surface 541 of the $2a^{th}$ cam 54 (refer to FIG. 20(B)), thereby rotating the cam member 50 in the $2a^{th}$ rotational direction R2a so that the $1a^{th}$ cam 52 is located in the first contact area 101 and the $1b^{th}$ cam 53 is located outside the first contact area 101 (refer to FIG. 20(C)).

In the process in which the armrest 30 enters the first posture from the ready posture during the posture change of the armrest 30 from the third posture to the first posture, the second tooth 42 is moved by rotation in the $1a^{th}$ rotational direction R1a and is separated from the second contact area 102.

The first tooth 41 is moved by rotation in the $1a^{th}$ rotational direction R1a toward the first contact area 101 in which the $1a^{th}$ cam 52 is located, and the $1a^{th}$ contact side surface 411 thereof is brought into contact with the $1a^{th}$ cam inner surface 521 of the $1a^{th}$ cam 52 (refer to FIG. 20(D)), thereby rotating the cam member 50 in the $2b^{th}$ rotational direction R2b so that the locking recess 51 is moved to the locking position. Accordingly, the first tooth 41 is inserted into the locking recess 51 at the locking position (refer to FIG. 20(E)). When the first tooth 41 is inserted into the locking recess 51, the armrest 30 is restricted from further rotating in the $1a^{th}$ rotational direction R1a, with a result that the posture change of the armrest 30 to the first posture (0°) is completed.

As is apparent from the above description, according to the embodiment of the present disclosure, when an armrest is rotated by an occupant, a rotator may be rotated about a first axis together with the armrest, and a locking tooth (first tooth) of the rotator may be moved so as to pass through a locking position. In addition, a cam member may be rotated in accordance with rotation control of the rotator in a contact manner, and a locking recess in the cam member may be moved so as to pass through the locking position. In addition, when the armrest is rotated and thus the posture of the armrest is changed to a locking posture (first posture), the locking tooth and the locking recess may be moved to the locking position, and the locking tooth may operate to be inserted into the locking recess. Accordingly, posture change of the armrest may be accurately and conveniently performed with a simple structure without a conventional operation knob or without separate driving force or elastic force.

According to the embodiment of the present disclosure, since the armrest is disposed between a driver seat and a front passenger seat and the posture thereof is capable of being changed to a posture (third posture) protruding toward a rear seat in accordance with rotation thereof, an occupant on the rear seat may use the armrest as a table or the like.

In addition, according to the embodiment of the present disclosure, since the posture of the armrest is capable of being changed to a posture (second posture) folded with respect to an armrest mount in accordance with rotation of the armrest, use convenience of an occupant may be further improved. Furthermore, by virtue of the folded posture (second posture), seat variation may be more easily performed without interference with the armrest.

The effects achievable through the disclosure are not limited to the above-mentioned effects, and other effects not mentioned herein will be clearly understood by those skilled in the art from this specification and the accompanying drawings.

While the present disclosure has been described above, the present disclosure is not limited to the disclosed embodiments and the accompanying drawings, and those skilled in the art may variously modify the present disclosure without departing from the technical spirit of the present disclosure. Also, it is noted that any one feature of an embodiment of the present disclosure described in the specification may be applied to another embodiment of the present disclosure. Similarly, the present invention encompasses any embodiment that combines features of one embodiment and features of another embodiment. In addition, the technical features described in the embodiments of the present disclosure may be independently carried out or two or more technical features may be combined.

What is claimed is:

1. An armrest assembly comprising:

an armrest mount disposed between a driver seat and a front passenger seat of a vehicle;

an armrest mounted on the armrest mount and configured to be rotatable about a first axis in a leftward-rightward direction, the armrest being configured to be changeable in posture to a first posture with a distal end facing forward, a second posture with the distal end facing downward, and a third posture with the distal end facing backward depending on rotation of the armrest;

a cam member configured to be rotatable about a second axis parallel to the first axis, the cam member comprising a first contact cam configured to be moved by rotation so as to pass through a first contact area between the first axis and the second axis, a second contact cam configured to be moved by rotation so as to pass through a second contact area defined opposite the first contact area with respect to the second axis, and a locking recess configured to be moved by rotation so as to pass through the first contact area in accordance with rotation thereof; and a rotator connected to the armrest so as to be rotated together with the armrest, the rotator being configured to transmit rotational force of the armrest to the cam member by contact to control rotation of the cam member so that the locking recess is located at a locking position in the first contact area or is moved out of the locking position, the rotator comprising a first tooth configured to be moved by rotation so as to pass through the first contact area and to move the second contact cam into or out of the second contact area through contact with the first contact cam in the first contact area in accordance with rotation of the armrest, a second tooth configured to be moved by rotation so as to pass through the second contact area and to move the first contact cam into or out of the first contact area through contact with the second contact cam in the second contact area in accordance with rotation of the armrest, and a cam rail configured to approach and contact the first contact cam moved out of the first contact area so that the second contact cam is moved to the second contact area or to approach and contact the second contact cam moved out of the second contact area so that the first contact cam is moved to the first contact area in accordance with rotation of the armrest, wherein, when the posture of the armrest is changed to the first posture, the first tooth and the locking recess are moved to the locking position, and the first tooth is inserted into the locking recess.

2. The armrest assembly as claimed in claim 1, wherein, when viewed from a left side of the armrest assembly, assuming that a $1a^{th}$ rotational direction is a counterclockwise rotation direction and a $1b^{th}$ rotational direction is a clockwise rotation direction about the first axis, that a $2a^{th}$ rotational direction is a counterclockwise rotation direction and a $2b^{th}$ rotational direction is a clockwise rotation direction about the second axis, and that the $1a^{th}$ rotational direction is a direction in which the armrest is rotated downwardly from the first posture, the first tooth comprises a $1a^{th}$ contact side surface facing in the $1a^{th}$ rotational direction and a contact end surface defining a tooth end of the first tooth, the locking recess comprises a $1a^{th}$ inner surface facing in the $2a^{th}$ rotational direction and a $1b^{th}$ inner surface facing in the $2b^{th}$ rotational direction, and when the first tooth is inserted into the locking recess, the $1a^{th}$ contact side surface is brought into contact with the $1a^{th}$ inner surface, and the contact end surface is brought into contact with the $1b^{th}$ inner surface, so that the first tooth transmits rotational force of the armrest in the $1a^{th}$ rotational direction to the cam member in a manner of distributing the rotational force in two opposite rotational directions through the $1a^{th}$ inner surface and the $1b^{th}$ inner surface, thereby restricting rotation of the cam member in the $2b^{th}$ rotational direction.

3. The armrest assembly as claimed in claim 2, wherein the contact end surface is formed in an arc shape corresponding to an imaginary inscribed circle centered on the first axis, and wherein, when the first tooth is inserted into the locking recess, the $1b^{th}$ inner surface is brought into point contact with the contact end surface outside the inscribed circle, so that, when the armrest is rotated in the $1b^{th}$ rotational direction from the first posture, the first tooth is separated from the locking recess.

4. The armrest assembly as claimed in claim 3, wherein the first contact cam comprises a $1a^{th}$ cam and a $1b^{th}$ cam adjacent to each other, wherein the $1a^{th}$ inner surface is formed at the $1a^{th}$ cam, the $1b^{th}$ inner surface is formed at the $1b^{th}$ cam, and the locking recess is formed between the $1a^{th}$ cam and the $1b^{th}$ cam, and wherein the $1a^{th}$ inner surface is a $1a^{th}$ cam inner surface of the $1a^{th}$ cam, and the $1b^{th}$ inner surface is a $1b^{th}$ cam inner surface of the $1b^{th}$ cam.

5. The armrest assembly as claimed in claim 4, wherein the $1a^{th}$ cam comprises a $1a^{th}$ cam outer surface facing in the $2b^{th}$ rotational direction, and the $1b^{th}$ cam comprises a $1b^{th}$ cam outer surface facing in the $2a^{th}$ rotational direction, wherein the second contact cam comprises a $2a^{th}$ cam and a $2b^{th}$ cam adjacent to each other, the $2a^{th}$ cam comprises a $2a^{th}$ cam inner surface facing in the $2b^{th}$ rotational direction and a $2a^{th}$ cam outer surface facing in the $2a^{th}$ rotational direction, and the $2b^{th}$ cam comprises a $2b^{th}$ cam inner surface facing in the $2a^{th}$ rotational direction and a $2b^{th}$ cam outer surface facing in the $2b^{th}$ rotational direction, wherein the first tooth comprises a $1b^{th}$ contact side surface facing in the $1b^{th}$ rotational direction, the second tooth comprises a $2a^{th}$ contact side surface facing in the $1a^{th}$ rotational direction and a $2b^{th}$ contact side surface facing in the $1b^{th}$ rotational direction, and the cam rail comprises a first contact rail disposed at a side facing in the $1a^{th}$ rotational direction and a second contact rail disposed at a side facing in the $1b^{th}$ rotational direction, wherein the second tooth and the cam rail are disposed opposite each other with respect to the first axis, wherein, when the armrest is in the first posture, the $2a^{th}$ cam is located in the second contact area, wherein, when the first tooth is separated from the locking recess in the first posture, the second tooth is moved to the second contact area, and wherein, when the armrest is rotated in the $1a^{th}$ rotational direction, the first contact rail of the cam rail approaches the cam member, and when the armrest is rotated in the $1b^{th}$ rotational direction, the second contact rail of the cam rail approaches the cam member.

6. The armrest assembly as claimed in claim 5, wherein, when the armrest is rotated by a set angle in the $1b^{th}$ rotational direction from the first posture and enters a ready posture in which the first tooth is separated from the locking recess, the $2b^{th}$ contact side surface of the second tooth is brought into contact with the $2a^{th}$ cam outer surface, thereby rotating the cam member in the $2b^{th}$ rotational direction so that the $1a^{th}$ cam is located outside the first contact area and the $1b^{th}$ cam is located in the first contact area, and wherein, when the armrest in the ready posture is rotated in the $1a^{th}$ rotational direction and the posture of the armrest is changed to the second posture, the first tooth is moved to the first contact area in which the $1b^{th}$ cam is located, and the $1a^{th}$ contact side surface is brought into contact with the $1b^{th}$ cam outer surface, thereby rotating the cam member in the $2b^{th}$ rotational direction so that the first contact cam is located outside the first contact area and the second contact cam is located outside the second contact area, and the first contact rail of the cam rail approaches the $2b^{th}$ cam outside the second contact area and is brought into contact with the $2b^{th}$ cam outer surface, thereby rotating the cam member in the $2a^{th}$ rotational direction so that the $1a^{th}$ cam is located in the first contact area.

7. The armrest assembly as claimed in claim 6, wherein, when the armrest is rotated in the $1b^{th}$ rotational direction from the second posture and assumes the ready posture, the first tooth is moved to the first contact area in which the $1a^{th}$ cam is located, and the $1b^{th}$ contact side surface is brought into contact with the $1a^{th}$ cam outer surface, thereby rotating the cam member in the $2a^{th}$ rotational direction so that the $2a^{th}$ cam is located outside the second contact area and the $2b^{th}$ cam is located in the second contact area, and the second tooth is moved to the second contact area in which the $2b^{th}$ cam is located, and the $2b^{th}$ contact side surface is brought into contact with the 2b$^{th}$ cam inner surface, thereby rotating the cam member in the 2b$^{th}$ rotational direction so that the 1a$^{th}$ cam is located in the first contact area and the 1b$^{th}$ cam is located outside the first contact area, and wherein, when the armrest in the ready posture is rotated in the 1a$^{th}$ rotational direction and the posture of the armrest is changed to the first posture, the first tooth is moved to the first contact area in which the 1a$^{th}$ cam is located, and the 1a$^{th}$ contact side surface is brought into contact with the 1a$^{th}$ cam inner surface, thereby rotating the cam member in the 2b$^{th}$ rotational direction so that the locking recess is moved to the locking position and allowing the first tooth to be inserted into the locking recess at the locking position.

8. The armrest assembly as claimed in claim 5, wherein, when the armrest is rotated in the 1b$^{th}$ rotational direction from the first posture so that the first tooth is separated from the locking recess and the posture of the armrest is changed to the third posture, the 2b$^{th}$ contact side surface of the second tooth is brought into contact with the 2a$^{th}$ cam outer surface, thereby rotating the cam member in the 2b$^{th}$ rotational direction so that the first contact cam is located outside the first contact area and the second contact cam is located outside the second contact area, and the second contact rail of the cam rail approaches the 1a$^{th}$ cam outside the first contact area and is brought into contact with the 1a$^{th}$ cam outer surface, thereby rotating the cam member in the 2a$^{th}$ rotational direction so that the 2a$^{th}$ cam is located in the second contact area and the 2b$^{th}$ cam is located outside the second contact area.

9. The armrest assembly as claimed in claim 8, wherein, when the armrest is rotated in the 1a$^{th}$ rotational direction from the third posture and the posture of the armrest is changed to the first posture, the second tooth is moved to the second contact area in which the 2a$^{th}$ cam is located, and the 2a$^{th}$ contact side surface is brought into contact with the 2a$^{th}$ cam inner surface, thereby rotating the cam member in the 2a$^{th}$ rotational direction so that the 1a$^{th}$ cam is located in the first contact area and the 1b$^{th}$ cam is located outside the first contact area, and the first tooth is moved to the first contact area in which the 1a$^{th}$ cam is located, and the 1a$^{th}$ contact side surface is brought into contact with the 1a$^{th}$ cam inner surface, thereby rotating the cam member in the 2b$^{th}$ rotational direction so that the locking recess is moved to the locking position and allowing the first tooth to be inserted into the locking recess at the locking position.

10. The armrest assembly as claimed in claim 1, wherein the armrest mount comprises:

a front stopper configured to restrict rotation of the armrest when the armrest is in the second posture; and a rear stopper configured to restrict rotation of the armrest when the armrest is in the third posture.

11. A locking device comprising:

a cam member configured to be rotatable about a second axis parallel to a first axis defining a center of rotation of an armrest for vehicles;

a rotator connected to the armrest so as to be rotated together with the armrest, the rotator being configured to transmit rotational force of the armrest to the cam member by contact to control rotation of the cam member; and

a hinge shaft providing the second axis, the hinge shaft being configured to allow the cam member to be coupled thereto, the hinge shaft having a free-stop function, wherein the rotator comprises a locking tooth configured to be moved by rotation so as to pass through a locking position between the first axis and the second axis during rotation of the rotator, wherein the cam member comprises a locking recess movable by rotation so as to pass through the locking position in accordance with rotation control of the rotator, and wherein, when a posture of the armrest is changed to a locking posture due to rotation of the armrest, the locking tooth and the locking recess are moved to the locking position, and the locking tooth is inserted into the locking recess.

12. The locking device as claimed in claim 11, wherein the locking posture is a posture in which the armrest is in a horizontal state, and wherein, when viewed from a left side of the armrest, assuming that a 1a$^{th}$ rotational direction is a counterclockwise rotation direction and a 1b$^{th}$ rotational direction is a clockwise rotation direction about the first axis, that a 2a$^{th}$ rotational direction is a counterclockwise rotation direction and a 2b$^{th}$ rotational direction is a clockwise rotation direction about the second axis, and that the 1a$^{th}$ rotational direction is a direction in which the armrest is rotated downwardly from the locking posture, the locking tooth comprises a contact side surface facing in the 1a$^{th}$ rotational direction and a contact end surface defining a tooth end of the locking tooth, the locking recess comprises a 1a$^{th}$ inner surface facing in the 2a$^{th}$ rotational direction and a 1b$^{th}$ inner surface facing in the 2b$^{th}$ rotational direction, and when the locking tooth is inserted into the locking recess, the contact side surface is brought into contact with the 1a$^{th}$ inner surface, and the contact end surface is brought into contact with the 1b$^{th}$ inner surface, so that the locking tooth transmits rotational force of the armrest in the 1a$^{th}$ rotational direction to the cam member in a manner of distributing the rotational force in two opposite rotational directions through the 1a$^{th}$ inner surface and the 1b$^{th}$ inner surface.

13. An armrest assembly for vehicles, the armrest assembly comprising:

an armrest mount;

an armrest mounted on the armrest mount and configured to be rotatable about a first axis, the armrest being configured to be changed in posture in accordance with rotation thereof;

a cam member configured to be rotatable about a second axis parallel to the first axis; and a rotator connected to the armrest so as to be rotated together with the armrest, the rotator being configured to transmit rotational force of the armrest to the cam member by contact to control rotation of the cam member, wherein the rotator comprises a locking tooth configured to be moved by rotation so as to pass through a locking position between the first axis and the second axis during rotation of the rotator, wherein the cam member comprises a locking recess movable by rotation so as to pass through the locking position in accordance with rotation control of the rotator, wherein, when the posture of the armrest is changed to a locking posture, the locking tooth and the locking recess are moved by rotation to the locking position, and the locking tooth is inserted into the locking recess, and wherein the armrest is changeable in posture to a first posture with a distal end facing forward, a second posture with the distal end facing downward, and a third posture with the distal end facing backward depending on rotation of the armrest, and when the armrest is in the second posture or the third posture, the armrest is maintained in the second posture or the third posture due to restriction of rotation thereof by a stopper, and wherein the locking posture is the first posture.

14. The armrest assembly as claimed in claim 13, wherein the armrest mount is disposed between a driver seat and a front passenger seat, each being a front seat, and wherein, when the armrest is in the first posture, the armrest is provided to an occupant on the front seat, and when the armrest is in the third posture, the armrest is provided to an occupant on a rear seat.

15. The armrest assembly as claimed in claim 13, wherein the armrest mount comprises a support configured to support the armrest in an erected state so that the armrest is rotatable about the first axis, and wherein, when the armrest is in the second posture, the armrest is folded with respect to the support.

16. The armrest assembly as claimed in claim 13, wherein the armrest mount comprises:

a fixed member;

a movable member coupled onto the fixed member so as to be movable in a horizontal direction; and a support provided at the movable member, the support being configured to support the armrest so that the armrest is rotatable about the first axis.

\* \* \* \* \*